(12) United States Patent
Wissingh et al.

(10) Patent No.: US 10,171,528 B2
(45) Date of Patent: Jan. 1, 2019

(54) STREAMING OF SEGMENTED CONTENT

(71) Applicant: KONINKLIJKE KPN N.V., Rotterdam (NL)

(72) Inventors: Bastiaan Wissingh, Leiden (NL); Menno Bangma, The Hague (NL); Ray Van Brandenburg, The Hague (NL); Mattijs Oskar Van Deventer, Leidschendam (NL)

(73) Assignee: Koninklijke KPN N.V., Rotterdam (NL)

(*) Notice: Subject to any disclaimer, the term of this patent is extended or adjusted under 35 U.S.C. 154(b) by 246 days.

(21) Appl. No.: 14/899,534

(22) PCT Filed: Jul. 2, 2014

(86) PCT No.: PCT/EP2014/064022
§ 371 (c)(1),
(2) Date: Dec. 17, 2015

(87) PCT Pub. No.: WO2015/000936
PCT Pub. Date: Jan. 8, 2015

(65) Prior Publication Data
US 2016/0149978 A1  May 26, 2016

(30) Foreign Application Priority Data
Jul. 3, 2013  (EP) .................................. 13174981

(51) Int. Cl.
*H04L 29/06* (2006.01)
*H04N 21/262* (2011.01)
(Continued)

(52) U.S. Cl.
CPC ........ *H04L 65/4069* (2013.01); *H04L 65/601* (2013.01); *H04N 21/26258* (2013.01);
(Continued)

(58) Field of Classification Search
CPC .............. H04L 65/4069; H04L 65/601; H04N 21/8456; H04N 21/44222; H04N 21/458;
(Continued)

(56) References Cited

U.S. PATENT DOCUMENTS 6,553,376 B1   4/2003  Lewis
2004/0010613 A1  1/2004  Apostolopoulos et al.
(Continued)

FOREIGN PATENT DOCUMENTS

EP    2 131 362 A1   12/2009
JP    2011-53244     2/1999
(Continued)

OTHER PUBLICATIONS

Liu, Client-Driven Joint Cache Management and Rate Adaption for Dynamic Adaptive Streaming over HTTP, Jan. 3, 2013.*
(Continued)

*Primary Examiner* — Chris Parry
*Assistant Examiner* — Weiwei Y Stiltner
(74) *Attorney, Agent, or Firm* — Hamilton, Brook, Smith & Reynolds, P.C.

(57) ABSTRACT

Methods and systems for enabling streaming of segmented content from a content delivery network to an adaptive streaming client on the basis of a manifest file are described wherein the said manifest file may comprise one or more segment identifiers. The method may comprise: selecting at least one segment identifier from said manifest file, said identifier identifying a segment that has not been requested by said client; and, sending pre-announce information to said content delivery network for announcing in advance that said segment may be requested by said client, said pre-announce information comprising said at least one segment identifier, said pre-announce information being further arranged for triggering said content delivery network to
(Continued)

ensure availability of said segment upon receiving said request.

12 Claims, 16 Drawing Sheets

(51) Int. Cl.
 *H04N 21/442*    (2011.01)
 *H04N 21/458*    (2011.01)
 *H04N 21/466*    (2011.01)
 *H04N 21/845*    (2011.01)

(52) U.S. Cl.
 CPC . *H04N 21/44209* (2013.01); *H04N 21/44222* (2013.01); *H04N 21/458* (2013.01); *H04N 21/4667* (2013.01); *H04N 21/8456* (2013.01)

(58) Field of Classification Search
 CPC ......... H04N 21/44209; H04N 21/4667; H04N 21/26258
 USPC ...................................................... 709/231
 See application file for complete search history.

(56) References Cited

U.S. PATENT DOCUMENTS

| | | | |
|---|---|---|---|
| 2004/0078293 | A1 | 4/2004 | Iverson et al. |
| 2005/0071881 | A1 | 3/2005 | Deshpande |
| 2007/0038873 | A1 | 2/2007 | Oliveira |
| 2009/0292819 | A1 | 11/2009 | Kandekar et al. |
| 2009/0313330 | A1 | 12/2009 | Sakamoto |
| 2010/0011061 | A1 | 1/2010 | Hudson |
| 2010/0161756 | A1 | 6/2010 | Lewis et al. |
| 2010/0169458 | A1 | 7/2010 | Biderman et al. |
| 2010/0226372 | A1 | 9/2010 | Watanabe |
| 2010/0241757 | A1 | 9/2010 | Hu et al. |
| 2010/0299443 | A1 | 11/2010 | Hu et al. |
| 2011/0066673 | A1 | 3/2011 | Outlaw |
| 2011/0082924 | A1 | 4/2011 | Gopalakrishnan |
| 2011/0145303 | A1* | 6/2011 | Boldyrev .......... G06F 17/30433 707/812 |
| 2011/0225371 | A1* | 9/2011 | Spry .................... G06F 12/0862 711/137 |
| 2011/0231519 | A1 | 9/2011 | Luby |
| 2011/0314130 | A1 | 12/2011 | Strasman |
| 2012/0090036 | A1 | 4/2012 | Kang et al. |
| 2012/0254591 | A1* | 10/2012 | Hughes ............... G06F 9/30018 712/205 |
| 2013/0054728 | A1 | 2/2013 | Amir et al. |
| 2013/0097309 | A1* | 4/2013 | Ma ..................... H04L 29/08099 709/224 |
| 2013/0132605 | A1* | 5/2013 | Kocks .................. H04N 21/262 709/231 |
| 2013/0166906 | A1 | 6/2013 | Swaminathan |
| 2013/0191511 | A1* | 7/2013 | Liu ..................... H04L 67/2847 709/219 |
| 2014/0089467 | A1* | 3/2014 | Beck ........................ H04L 67/02 709/219 |
| 2014/0156948 | A1* | 6/2014 | Roberts ............... G06F 12/0895 711/143 |
| 2014/0245359 | A1* | 8/2014 | De Foy ............. H04W 36/0011 725/62 |
| 2014/0359081 | A1 | 12/2014 | Van Deventer |
| 2015/0195243 | A1 | 7/2015 | Roskind |
| 2016/0198202 | A1 | 7/2016 | Van Brandenburg et al. |

FOREIGN PATENT DOCUMENTS

| | | |
|---|---|---|
| JP | 2009-187466 | 8/2009 |
| WO | WO 2009/075033 | 6/2009 |
| WO | WO 2009/095078 A1 | 8/2009 |
| WO | WO 2011/026887 A1 | 3/2011 |
| WO | WO 2011/047335 | 4/2011 |
| WO | WO 2011/127312 | 4/2011 |
| WO | WO 2011/066691 A1 | 6/2011 |
| WO | WO 2012/107341 | 8/2012 |
| WO | WO 2012/178174 | 12/2012 |
| WO | WO 2012/178174 A1 | 12/2012 |
| WO | WO 2014/090761 | 6/2014 |
| WO | WO2015/000936 | 1/2015 |

OTHER PUBLICATIONS

Cohen, E. and Kaplan, H., "Prefetching the Means for Document Transfer: A New Approach for Reducing Web Latency," *Computer Networks*, 39(4): 437-455 (2002).

"Information Technology—MPEG Systems Technologies—Part 6: Dynamic Adaptive Streaming Over HTTP (DASH)," from *International Organization for Standardization ISO/IEC JTC1/SC29/WG11 Coding of Moving Pictures and Audio*, Stockhammer, T. et al. (Eds.)Guangzhou, China, Oct. 2010, pp. 1-71.

Notification of Transmittal of the International Search Report and the Written Opinion of the International Searching Authority, International Application No. PCT/EP2014/064022, entitled "Streaming of Segmented Content", dated Oct. 13, 2014.

Hartung, Frank, et al., "DRM Protected Dynamic Adaptive HTTP Streaming," MMSys '11, pp. 277-282, Feb. 23-25, 2011.

Lee, Jin Young, et al., Dynamic Adaptive Streaming Over HTTP (DASH) EE#1-CMP Participants, International Organisation for Standardisation Organisation Internationale De Normalisation, ISO/IEC JTC1/SC29/WG11, Oct. 2010.

Ma, Kevin J. and Bartos, Radim, "DRM Workflow Analysis for Over-The-Top HTTP Segmented Delivery," IEEE, 2011.

Pantos, R. and May, W., "HTTP Live Streaming," draft-pantos-http-live-streaming-08, Apple, Inc., server dateMar. 26, 2012; downloaded by EPO on Mar. 27, 2012, Mar. 23, 2012.

Singer, David, "On HTTP Streaming," TSG-SA4#60 meeting, Tdoc S4 (10)0610, Aug. 2010.

Sodagar, Iraj, "The MPEG-DASH Standard for Multimedia Streaming Over the Internet," Industry and Standards, IEEE Computer Society, pp. 62-67, Oct.-Dec. 2011.

Van Brandenburg, R., et al., "Models for Adaptive-Streaming-Aware CDN Interconnection," draft-brandenburg-cdni-has-02, server date Jun. 26, 2012; downloaded by EPO on Jun. 29, 2012, Jun. 27, 2012.

Whitepaper Manual (2010).

Peterson, "A Simple Approach to CDN Interconnection," http://tools.ietf.org/html/draft-peterson-cdni-strawman-OO, A Simple Approach to CON Interconnection draft-peterson-cdni-strawman-00 (Apr. 19, 2011).

http://stackoverflow.com/questions/3778347/is-it-ok-to-http-redirect-images, Questions tab (Sep. 23, 2010).

http://blogs.msdn.com/b/ie/archive/2011 /03/17 /internet-explorer-9-network-performance-improvements.aspx, I EBlog (Mar. 17, 2011).

http://blog.chromium.org/2008/09/dns-prefetching-or-pre-resolving.html, The Chromium Blog, DNS Prefetching (or Pre-Resolving) (Sep. 17, 2008).

Stockhammer, T., et al., "Next segment signaling through HTTP GET extension for CDNs", International Organization for Standardisation, ISO/IEC JTC1/SC29/WG11, MPEG2010/M252986 Coding of Moving Pictures and Audio (Jul. 2012) Stockholm, Sweden.

Stockhammer, T., "Technologies under Consideration for Dynamic Adaptive Streaming over HTTP 23009, parts 1 and 4", International Organization for Standardisation, ISO/IEC JTC1/SC29/WG11 MPEG2011/N12887, Coding of Moving Pictures and Audio (Jul. 2012) Stockholm, Sweden.

Wikimedia Foundation, "HTTP cookie", Jun. 28, 2013, available via the Internet at en.wikipedia.org/w/index.php? title=HTTP cookie &oldid=561910611 (last visited Jun. 26, 2018).

Microsoft, "Smooth Streaming: The Official Microsoft IIS Site," Dec. 19, 2012, 2 pages, http://www.iis.net/downloads/microsoft/sm oath-streaming.

Adobe, "HTTP Dynamic Streaming," May 25, 2013, 2 pages, http://wwwimages.adobe.com/www.adobe.com/content/dam/ Adobe/en/products/hds-d yna m ic-strea m ing/pdfs/hds datasheet. Pdf.

(56) References Cited

OTHER PUBLICATIONS

3rd Generation Partnership Project, 3GPP TS 26.247 V12.0.0, Technical Specification Group Services and System Aspects; Transparent end-to-end Packet-switched Streaming Service (PSS); Progressive Download and Dynamic Adaptive Streaming over HTTP (3GP-DASH) (Release 12), Sep. 2013, 114 pages.

Information technology—MPEG systems technologies—Part 6: Dynamic adaptive streaming over HTTP (DASH), ISO/IEC JTC, ISO/IEC FCD 23001-6, Jan. 28, 2011, 86 pages.

Information technology—Dynamic adaptive streaming over HTTP (DASH)—Part 1: Media presentation description and segment formats, ISO/IEC 23009-1, Apr. 1, 2012, 134 pages.

Mavlankar, et al., "An interactive region-of-interest video streaming system for online lecture viewing," 18$^{th}$ International in Packet Video Workshop (PV), IEEE, pp. 64-71 (2010).

DNS Reviews, "DNS Comparison," Dec. 18, 2012, 24 pages, https://web.archive.org/web/20131218212046/http:I/ www.dnsreviews.com/dns-comparison/.

Network Performance, DNS Response Times, Jan. 2, 2012, 7 pages, http://www.plus.net/support/service/network_performance/dns_response_times.shtml.

Su, et al., "Drafting Behind Akamai {travelocity-based detouring)," ACM SIGCOMM Computer Communication Review 36.4, 2006, pp. 435-446.

Google code, "Minimize round-trip times," Mar. 14, 2012, 12 pages, https://web.archive.org/web/20120314000842/ http:// code_google.com/speed/page-speed/docs/rtt.html.

GTmetrix, "Page Speed: Minimize Redirects," May 31, 2012, 5 pages, https://web.archive.org/web/20120531001856/ http://gtmetrix.com/minimize-redirects.html.

RequestPolicy, "What is Prefetching?" Mar. 2, 2010, 1 page, https://web.archive/org/web/20100302173012/http:// www.requestpolicy.com/help/prefectch.

Title Unknown, http://www.limelightnetworks.com/2011/02/appnoteandroidapps/ (Applicant last attempted to access this webpage on Jul. 16, 2014, but the site would not load; Applicant does not have a printout of the webpage).

Pantos et al., "HTTP Live Streaming drafl-pantos-http-live-streaming-07," Sep. 30, 2011, 33 pages.

Stockhammer, et al., "Dynamic Adaptive Streaming over HTTP (DASH) MPEG," International Organization for Standardization, ISO/IEC JTC1/SC 29, MPEG/M18620 (Oct. 2010) Guangzhou, China.

\* cited by examiner

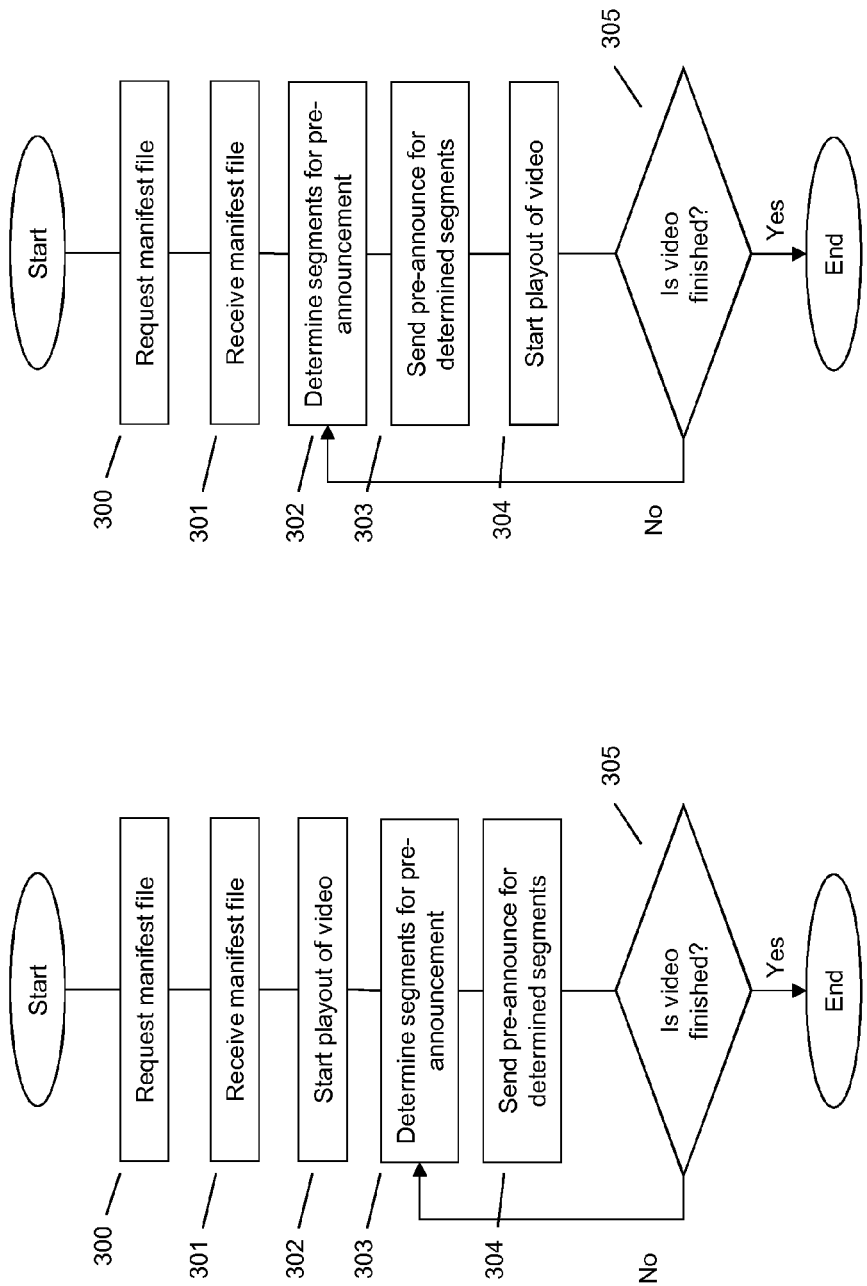

STREAMING OF SEGMENTED CONTENT

This application is the U.S. National Stage of International Application No. PCT/EP2014/064022, filed Jul. 2, 2014, which designates the U.S., published in English, and claims priority under 35 U.S.C. §§ 119 or 365(c) to European Application No. 13174981.4, filed Jul. 3, 2013.

FIELD OF THE INVENTION

The invention relates to streaming of segmented content and, in particular, though not exclusively, to a method for enabling streaming of segmented content from a delivery node to a device comprising an adaptive streaming client, a device comprising an adaptive streaming client for streaming of segmented content, a network node and a data structure for use with a client and a computer program product using such method.

BACKGROUND OF THE INVENTION

Currently an increasing number of video streaming techniques make use of so-called segmentation. For example, HTTP adaptive streaming (HAS), Scalable Video Coding (SVC) and spatially segmented video (e.g. tiled video) use segmentation on the basis of time, quality and space respectively. During the segmentation process a so-called manifest file will be generated which describes the relation between the different segment files and/or streams and the location where the segments may be retrieved. A segment file may relate to a file comprising data associated with at least one segment, which may be retrieved by a file retrieval protocol, e.g. HTTP or FTP. Similarly, a segment stream may relate to a stream comprising data associated with at least one segment which may be retrieved by a streaming protocol, e.g. RTSP/RTP or HAS. A segment file or stream hereafter will be referred to as a segment. Further, video, or more in general, content rendered by a segmentation scheme may be referred to as segmented content.

In order to playout (playback) segments in the manifest file, a HAS client (hereafter in short a client) continuously requests segments from the network, typically a so-called content delivery network (CDN). A CDN may be regarded as a managed network of delivery nodes that are configured to deliver segments to clients. A client may use the segments defined in the manifest file to dynamically adjust the playout to changing bandwidth requirements and/or user input, e.g. by switching from a high to a low quality video stream or vice versa. Moreover, segmented content may also be used by content delivery systems, e.g. CDNs, in order to discriminate between popular and less popular video segments. For example, typically content associated with the beginning of a video will be watched (downloaded/accessed/retrieved) more often (more popular) than content at the end of the video. Similarly, low-bitrate lower-quality video content (e.g. the lowest resolution HAS segments or the so-called SVC base layer) will be watched (downloaded/accessed/retrieved) more frequently than high quality content (e.g. higher-resolution HAS segments or SVC enhancement layers).

The delivery of popular segments to clients from a single, (too) remote server may clog up network bandwidth. Hence, a content delivery network (CDN) that is configured to efficiently deliver content to a consumer may store (cache) the segments associated with more popular content at multiple delivery nodes in the CDN so that potential bandwidth problems may be reduced and efficient delivery is guaranteed. Additionally, a CDN may store popular segments for a longer period on the delivery node. A CDN content location manager may centrally manage the locations within the CDN where the segments may be retrieved and for how long the segments may be retrieved from those locations.

In order to enable a client to access segments stored in a CDN, the client is provided with a so-called manifest file identifying a list of segment identifiers and, optionally, segment locators pointing to locations in the network, which enable the client to retrieve the segments. Typically, a client is configured to retrieve segments such that the segment buffer associated with the client (device) is loaded with a predetermined number of segments before play-out is started. Furthermore, during play-out, the client continuously retrieves segments from the network on the basis of the manifest file so that sufficient segments are kept in a buffer. This way, latencies associated with segment retrieval process do not interfere with the seamless play-out of the segments.

In some cases however, segments identified in a manifest file may not (yet) be available on the delivery node when a client requests them. The non-availability of a segment may have different reasons. For example, the CDN may be configured not to pre-position segments its delivery nodes before the segments are actually requested. When a segment is requested for the first time, the CDN may trigger an ingestion process wherein a content origin, e.g. media storage or another CDN, may deliver the segments to the CDN (or one or more delivery nodes in the CDN). Such content ingestion scheme may provide the advantage that segments are only stored on the delivery nodes when there is a real demand for the content. Further, in order to efficiently manage the amount of stored segments in the CDN, segments may be available (cached) for a predetermined time. Less popular segments may be stored for relatively short cache period on delivery nodes. After this period the segments are removed, so that when they are requested after the period, the requested segments need to be re-ingested. In another situation, the popularity of segments in e.g. a live stream may suddenly increase steeply so that requested segments are not available on all delivery nodes the moment the request for a segment is received by the delivery node.

In the above-described situations, a segment request may result in the non-availability of a segment (a "cache miss"), which may trigger a process (e.g. a dynamic ingestion process) wherein the requested segments are provided to the delivery node. The ingestion of segments may invoke delays in the segments retrieval process by the client and reduction of the bandwidth that is available to the clients. When the ingestion process needs to be executed for multiple segments, the delivery of the requested segments may be considerably reduced. In order to try to maintain continuous playout, the HAS client perceives this delay as bandwidth problem and may react to such situation by switching over to the playout of a less bandwidth consuming low(er) quality segment steam. This may cause a substantial deterioration in the user experience. In the worst case, the client cannot maintain seamless playout of segments.

US2009/0292819 describes a method wherein during conventional playout of a media stream the client may prefetch "look-ahead" segments from a media server. This way a client may easily skip to the look-ahead segments without any substantial delays. In practice such prefetch scheme will lead to a situation wherein during the normal streaming process additional "look-ahead" segments are retrieved so that there is less bandwidth available between the client and the media server for the regular segments. If one would use such scheme in an adaptive streaming system, the HAS client would react to the bandwidth reduction by switching over to a segmented stream of lower quality.

Hence, there is a need in the art for improved method and systems for streaming of segmented content to a client. In particular, there is a need for methods and systems providing seamless play-out of segmented content even in the case that not all segments in a manifest file are available for delivery to the client the moment the client receives the manifest file.

SUMMARY OF THE INVENTION

It is an object of the invention to reduce or eliminate at least one of the drawbacks known in the prior art and to provide in a first aspect of the invention to a method for enabling streaming of segmented content from a delivery node to an adaptive streaming client on the basis of a manifest file, said manifest file comprising one or more segment identifiers, said method comprising: selecting at least one segment identifier from said manifest file, said segment identifier being associated with a segment that has not been requested by said client when said selecting is performed; and, sending pre-announce information to a delivery node or a content delivery network associated with said delivery node beforehand for announcing that said segment may be requested by said client, said pre-announce information comprising said at least one segment identifier, said pre-announce information being further arranged for triggering said delivery node or said content delivery network to ensure availability of said segment when said at least one segment is requested. The method may be used in a simple client-server model comprising one delivery node (media server) for delivery of the segments to the clients or in one or more content delivery networks wherein multiple delivery nodes may deliver segments to the clients.

The method according to the invention allows an adaptive streaming client to select one or more segment identifiers of segments that are listed in a manifest file, that are not (yet) requested by said client but which may (i.e. which are expected or predicted to) be requested by said client. The segment identifiers may be used to pre-announce a delivery node that the segments should be available to clients when a client requests them. Hence, the pre-announcement information is sent to the delivery node or the content delivery network in anticipation of a possible or a future request for said segment by the client. If the segments are not available in the content delivery network, the network may start a process for retrieving these segments and storing them on the delivery node or in the content delivery network. This way, segments can be readily delivered to a client that requests the segments. Delays due to segment misses may be substantially reduced so that the adaptive streaming client will not switch over to low quality segments thereby ensuring that high quality segments are delivered to the client.

In an embodiment said pre-announce information may comprise a time period defining a period wherein said segment request is expected to be requested by said client. The pre-announce information thus comprises information about segments that may be requested in the near future, i.e. within a predetermined time period. The time period may be determined (predicted) on the basis of user statistics or the like.

In an embodiment, ensuring availability of said segment further may comprise: verifying whether the segment associated with said at least one segment identifier is stored on said delivery node; and, if said segment is not stored on said delivery node, storing said segment on said delivery node; or, if said segment is stored on said delivery node, maintaining the storage of said segment for a predetermined time period, preferably said predetermined period being as long as the period wherein said segment request is expected to be requested by said client. Hence, the pre-announce information may trigger the delivery node or content delivery network to verify the availability of segments. If the segments are not available, a segment retrieval process may be triggered that retrieves the segments and stores the segment on the delivery node or the content delivery network, such segment retrieval process may include e.g. an ingestion process. If the segments are stored for only a predetermined time and e.g. a cache algorithm will remove the segments from the cache within a certain time period, the storage time of these segments may be extended so that the availability of the segments is maintained.

In an embodiment said method may further comprise sending said pre-announce information in a pre-announce message to said content delivery node, said content delivery network or a (request routing) node in said content delivery network. In an embodiment said pre-announce message may be an (HTTP) message. In yet another embodiment, the header of the (HTTP) message may comprise a pre-announce indicator that signals said delivery node or said content delivery network that the message is a pre-announce message (or should be interpreted as a pre-announce message). In another embodiment said message may comprises at least one segment locator (URL) associated with said at least one segment. In yet another embodiment at least part said pre-announce information may be inserted in the header of said message; and/or, in the body of said message. In a further embodiment said message may be one of a HTTP HEAD, HTTP GET or HTTP POST message.

Hence, in order for the content delivery network, more specifically the request routing node in a CDN, or a delivery node to distinguish between standard (HTTP) messages and (HTTP) messages that serve as a pre-announce message, the header of the (HTTP) message may comprise a field comprising a pre-announce indicator that signals the delivery node or the content delivery network that the message should be interpreted as a pre-announce message. Various implementations of such pre-announce indicator are described in this application including a flag, a token or pre-announce cookie value that may be inserted in the header of a (HTTP) message.

In another embodiment, said sending may further comprise: sending said pre-announce information in an HTTP request message to a request routing node of a content delivery network; (subsequently) receiving a HTTP redirect message from said request routing node, said redirect message comprising the address or a segment locator associated with a delivery node in said content delivery node from which delivery of said segment may be requested by said client; and, said client or said request routing node sending said pre-announce information in an HTTP request message to said delivery node on the basis of said address or segment locator. In a further embodiment, said client may write (insert) said address or segment locator in said manifest file. Hence, the information used to process the pre-announce HTTP messages, including information in HTTP redirect messages may be used to at least partially resolve one or more segment locators of the manifest file that is stored in the cache of the devices that comprises the adaptive streaming client. This way pre-announcing and pre-resolving may be combined to even further reduce delays during the requesting of segments by the client.

In a further embodiment, said method may comprise: sending a pre-announce support message to said delivery node or content delivery network for verifying whether said triggering by said delivery node or said content delivery network to ensure availability of said segment is supported by said delivery node or said content delivery network. In another embodiment, said method may comprise: if said delivery node or said content delivery network supports the processing of pre-announce information of a client, receiving a support confirmation message from said delivery node or said content delivery network indicating that said triggering is supported.

In an embodiment, selecting said at least one segment identifier may further comprise: using user navigation information from a user navigation function in said client and/or general navigation information in said manifest file for predicting said segment that may be requested within a predetermined time period.

In an embodiment said pre-announce information may be sent over a separate communication channel to said delivery node or said content delivery network. In a further embodiment said separate communication channel may be used by said delivery node or said content delivery network to activate or deactivate a pre-announcement function in said client and/or to send an updated manifest file to said client. In a further embodiment, the communication channel may be a (bi-directional) Websocket communication channel. Hence, separate bi-directional Websocket channel may be set up between a client and a delivery node or a CDN that allows efficient processing of pre-announce messages. Further, it allows for the network to dynamically (de)activate and/or adjust the pre-announce functionality.

In an embodiment said delivery node or said content delivery network may keep track of segments that it has stored within a predetermined period. In an embodiment said delivery node or content delivery network is not triggered by said pre-announce information if said content delivery network receives pre-announce information associated with a segment (identifier) that has been stored within said predetermined period. These embodiments thus imply that if the segment identifier in the pre-announce information is determined to be the same as a segment identifier of a segment stored during the predetermined period, the ensuring mechanism is not triggered. The ensuring mechanism consumes resources, especially with very large segment databases & storages. If the predetermined period is for instance short enough, it may just be assumed that the segment is still there and not yet removed.

In a further embodiment, said method may further comprise: a filter function in said content delivery node, said content delivery node, or a request routing node in said content delivery node, filtering messages that comprise pre-announce information and messages that do not comprise pre-announce information. In an embodiment, said filtering includes checking whether said message comprise a pre-announce indicator or not.

In yet a further embodiment, said method may comprise: a message comprising pre-announce information triggering a cache control function in said delivery node or said content delivery network for checking the availability of a segment and, if said segment is not stored on said delivery node, storing said segment on said delivery node; or, if said segment is stored on said delivery node, maintaining the storage of said segment for a predetermined time period, preferably said predetermined period being at least as long as the period wherein said segment request is expected to be requested by said client.

In a further aspect, the invention may relate to a device comprising an adaptive streaming client configured for requesting of segmented content that is stored on a delivery node, preferably a delivery node of a content delivery network, wherein said client device comprise at least one of: a cache for storing at least part of a manifest file, said manifest file comprising one or more segment identifiers for locating said delivery node; a segment selector configured for selecting at least one segment identifier from said manifest file, said segment identifier identifying a segment that has not been requested by said client when said selecting is performed; and/or, a pre-announce function configured for sending pre-announce information to a delivery node or a content delivery network associated with said delivery node beforehand for announcing that said segment may be requested by said client, said pre-announce information comprising said at least one segment identifier, said pre-announce information being further arranged for triggering said delivery node or said content delivery network to ensure availability of said segment when said at least one segment is requested.

In a further embodiment said client may be further configured for: preparing message, preferably an (HTTP) request message, said message comprising pre-announce information and a pre-announce indicator, and sending said message to said delivery node or said content delivery network sending said pre-announce information in a message, preferably an (HTTP) request message to the content delivery network associated with said content delivery node, preferably said message comprising at least one segment locator (URL) associated with said at least one segment that the client may request and wherein said pre-announce information is inserted in the header of said message; and/or, in the body of said message, preferably said message being one of an HTTP HEAD, HTTP GET, HTTP POST message.

In another aspect, the invention may relate to a network node, preferably for use with device as described above, wherein said network node may comprise at least one of a: a cache control function configured for receiving pre-announce information for announcing that a segment may be requested by a client, said pre-announce information comprising said at least one segment identifier, said pre-announce information being further arranged for triggering said network node to ensure availability of said segment when said at least one segment is requested; and/or, a filter function for distinguishing between said message comprising pre-announce information and other messages not comprising pre-announce information, preferably by checking the presence of a pre-announce indicator in said message, wherein pre-announce information comprises said at least one segment identifier, said pre-announce information being arranged for triggering a delivery node or a content delivery network to ensure availability of said segment by said delivery node or content delivery network when said segment is requested by a client.

In an embodiment ensuring availability of said segment may comprise: verifying whether the segment associated with said at least one segment identifier is stored on said delivery node; and, if said segment is not stored on said delivery node, storing said segment on said delivery node; or, if said segment is stored on said delivery node, maintaining the storage of said segment for a predetermined time period, preferably said predetermined period being at least as long as the period wherein said segment request is expected to be requested by said client In yet another aspect, the invention may relate to a data structure, preferably a least part of a manifest file for use by an adaptive streaming client as described above, wherein said data structure may comprise one or more segments identifiers, preferably URLs, for locating one or more delivery nodes configured to deliver one or more segments identified by said one or more segment identifiers to said client; and wherein said data structure may further comprise at least one of: pre-announce support information instructing said client that said one or more delivery nodes are configured to process pre-announce information and, optionally, instructing said client to use its pre-announce function that is configured for sending pre-announce information to said one or more delivery nodes for announcing in advance that a segment may be requested by said client; and/or, one or more markers associated with said one or more segment identifiers, a marker enabling said pre-announce function in said client to select at least one segment identifier from said manifest file.

The invention may also relate to a program product comprising software code portions configured for, when run in the memory of a computer, executing the method steps according to any the method steps as described above. The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 3A-3C depict flow diagrams for streaming segmented content according to various embodiments of the invention.

DETAILED DESCRIPTION

Figure 1B:
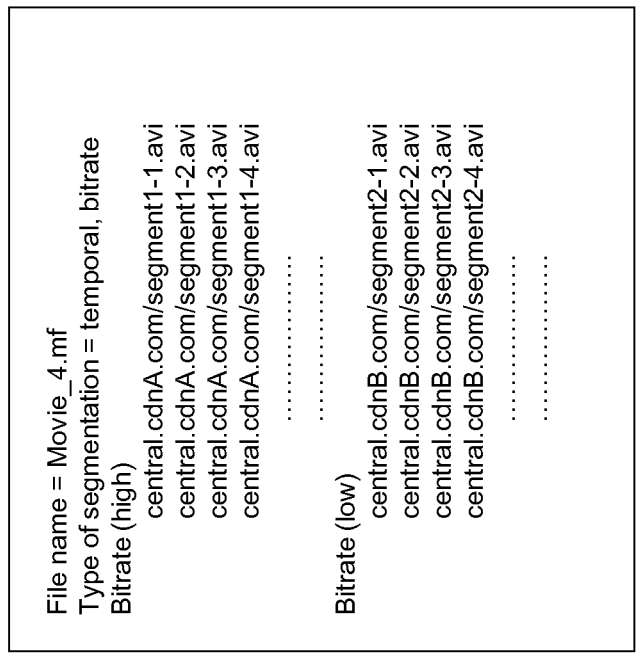
FIGS. 1A and 1B depict a conventional adaptive streaming client and a manifest file for use in such client.
Figure 1A:
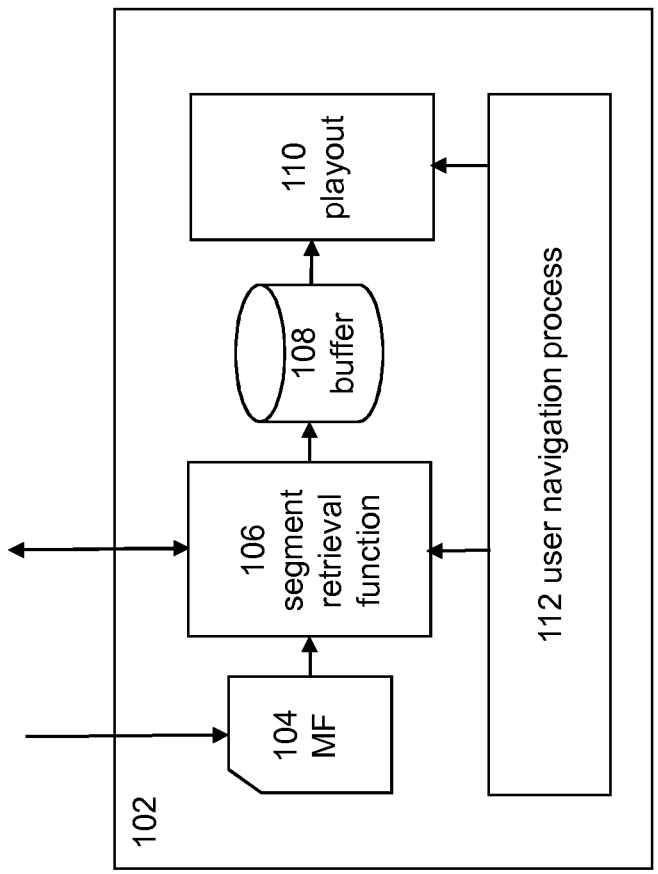

FIGS. 1A and 1B depict a conventional adaptive streaming (AS) client and a manifest file for use with such HAS client respectively. The client 102 may be hosted on a terminal (not shown), which is configured to communicate with one or more media servers in the network and to enable streaming of content on the basis of an adaptive streaming protocol, e.g., such as Apple HTTP Live Streaming [http://tools.ietf.org/html/draft-pantos-http-live-streaming-07], Microsoft Smooth Streaming [http://www.iis.net/download/SmoothStreaming], Adobe HTTP Dynamic Streaming [http://www.adobe.com/products/httpdynamicstreaming], 3GPP-DASH [TS 26.247 Transparent end-to-end Packet-switched Streaming Service (PSS); Progressive Download and Dynamic Adaptive Streaming over HTTP] and MPEG Dynamic Adaptive Streaming over HTTP [MPEG DASH ISO/IEC 23001-6].

The terminal may generally relate to a content processing device, e.g. a (mobile) content play-out device such as an electronic tablet, a smart-phone, a notebook, a media player, etc. In some embodiment, a terminal may be a set-top box or content storage device configured for processing and temporarily storing content for future consumption by a content play-out device.

A user may connect a terminal to a network, e.g. the Internet, browse a website of a content provider comprising video title links and select one. Upon selection of a link, e.g. an URL, a manifest file may be sent to the client. Here, the term manifest file may generally refer to a special data structure comprising segment identifiers (descriptors) identifying the segments building the video title or a part thereof, location information of a (set of) network node(s), e.g. media server(s), which may be configured to either deliver the segments to the client or to provide the client with information where the segments may be retrieved and, optionally, segment control information determining the relation between the segments which may be used by the client to correctly determine a sequence of segments for play-out. In some cases, e.g. live stream, multiple manifest files may be used to playout the media. Different protocols may use different names for a manifest file. For example, in the DASH streaming protocol a manifest file may be referred to as a media presentation description (MPD).

FIG. 1B depicts a schematic of a manifest file comprising segment identifiers for identifying segments building a content item. Optionally, a manifest file may comprise location information comprising references to one or more network nodes which are configured to deliver the identified segments to a client or which are configured to provide the client with information where the segments may be retrieved. Hence, such reference, which hereafter may be referred to as segment locator, may point to a network node configured to deliver an identified segment; or, alternatively, to a network node that is able to determine one or more network nodes which may be able to deliver an identified segment. In yet another embodiment, a segment locator may also point to location on a network node. For example, different segment locators may point to different folders defined in one delivery node.

Here the term delivery node may be any type of network node that is configured to deliver segments to a client.

Depending on the context, a delivery node may also be referred to as an edge node, a cache, a serving node or an HTTP (web) server.

An HAS client may use the manifest file to locate delivery nodes configured to deliver segments identified in the manifest file to the client. To that end, the manifest file may comprise at least one segment identifier, e.g. a segment file name, for identifying a segment. It may further comprise location information in the form of at least one segment locator associated with a segment identifier. A segment locator may be defined as a pointer to one or more network nodes (or one or more folders on a network node) which are configured to host the identified segment and to deliver the segment to a client or which are configured to determine one or more further network nodes which may be able to deliver the identified segment to the client.

In some embodiments, a segment identifier and a segment locator may be part of a predetermined data structure such as an URL. For example, the URL central.cdnA.com/segment1-1.avi comprises a segment locator central.cdnA.com, i.e. a pointer (or a reference) to a network node of CDN A and a segment identifier, i.e. segment file name segment1-1.avi wherein the network node associated with segment locator central.cdnA.com may be configured to deliver a segment to the client or may be configured to deliver one or more further segment locators pointing to one or more network nodes which may be able to deliver the segment segment1-1.avi.

Although the examples hereunder are described using URLs, it is submitted that the invention is not limited thereto. In another embodiment, the segment identifiers and segment locators may take any suitable format suitable for identifying and locating segments in the network. In some embodiments, the segment identifier and the segment locator may coincide in the sense that either the segment identifier or the segment locator may be used for identifying and locating a segment in the network.

In the example of FIG. 1B, the manifest file comprises URLs associated with two different sets of segments, i.e. a first set of low bitrate segments and a second set of high-bitrate segments, wherein each set contains the video title. Here, the segment locator part of the URLs associated with the low-bitrate segments may point to a network node of a first content delivery network CDN A and the high-bitrate segments may point to a network node of a second CDN B. The different set of segments may define different representations, a high quality representation and a low quality representation of the same content. The client may retrieve segments on the basis of the segment URLs in the manifest file. This scheme is described hereunder in more detail.

As illustrated in FIG. 1A, the manifest file may be stored in a manifest cache 104 and parsed and structured into a segment list, i.e. a logical data structure, comprising information for retrieving segments, e.g. segment identifiers (e.g. the segments file names) and segment locators, e.g. a predetermined parts of URL(s), for determining where these segments may be retrieved, and play-out control information for controlling the play-out of the segments, i.e. the relation between the segments (e.g. time relationship, quality relationship and/or spatial relationship).

A segment retrieval function 106 may use the location information in the manifest cache in order to retrieve segments from a media server or one or more delivery nodes associated with a content delivery network (CDN). The segments may be retrieved using a (segment) transfer protocol (typically this would be HTTP, but also RTSP/RTP, FTP and other protocols could be used) and temporarily stored into a segment buffer 108. Further, a video play-out function 110 (which may also referred to as the media engine) may play-out segments stored in the segment buffer on the basis of the information in the manifest cache.

The segment retrieval function may be configured to retrieve segments such that the segment buffer is loaded with a predetermined number of segments before play-out is started. Furthermore, during play-out, the segment retrieval function continuously retrieves segments on the basis of the manifest file so that sufficient segments are stored in the segment buffer. Typically, the segment retrieval function may be configured to optimize the retrieval process on the basis of the bandwidth that is available between the client and the delivery node. This way, latencies associated with segment retrieval do not interfere with the seamless play-out of the segments. The segment retrieval function may accept and handle segment retrieval instructions from the user navigation function 112 so that a user is able to navigate through the segmented content as defined by the manifest file. Here, the segment retrieval instructions from the user navigation function may relate to temporal navigation (e.g. fast forwarding) and/or spatial navigation (e.g. panning-zooming-tilting).

Figure 2:
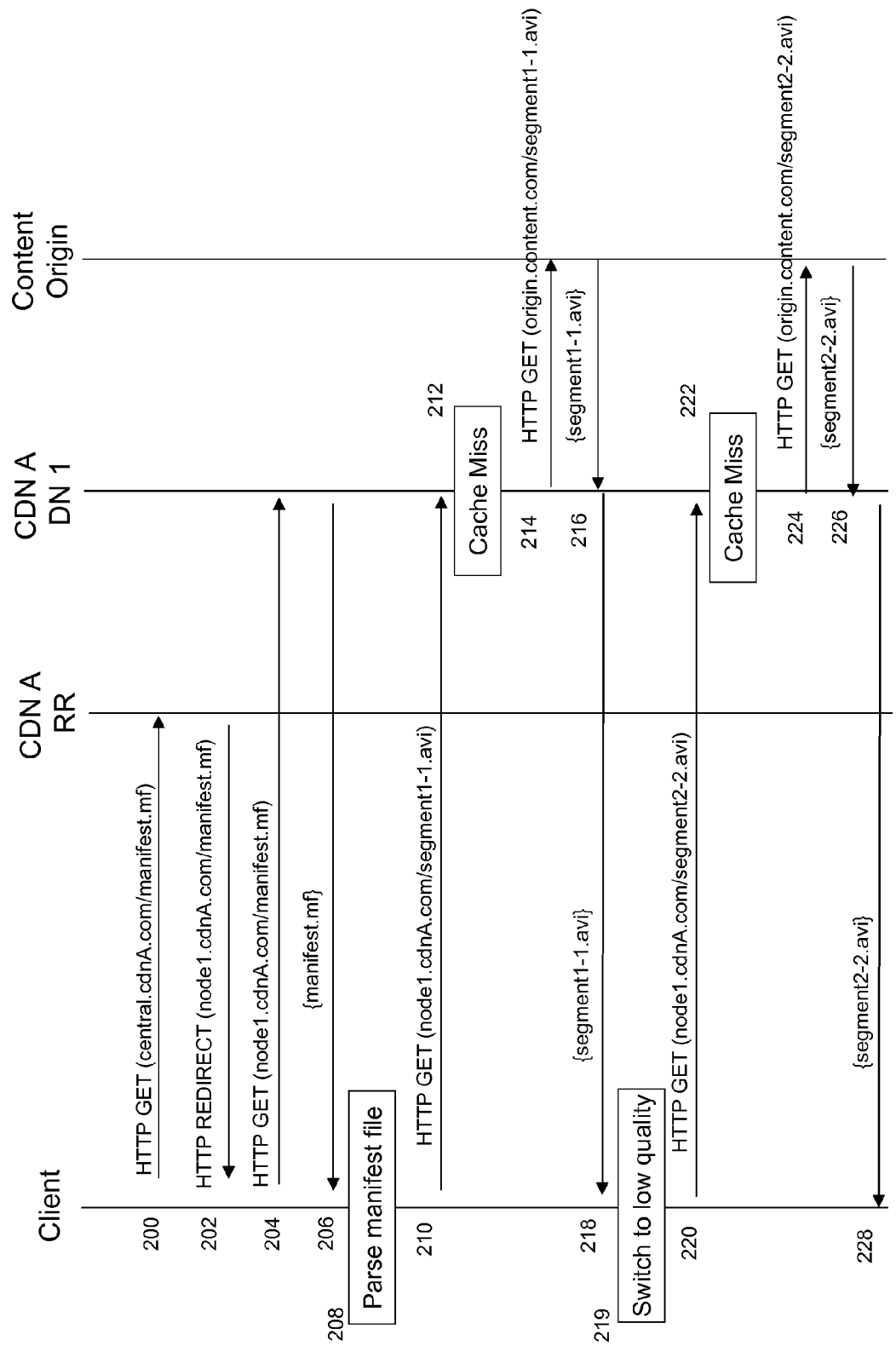
FIG. 2 depicts a flow diagram segment retrieval and playout process for conventional an HAS client.

FIG. 2 depicts a protocol flow of a segment retrieval and play-out process of a conventional HAS client as depicted in FIG. 1A. The process may start with the client requesting a manifest file from the network, e.g. a content delivery network CDNA. The request message, e.g. an HTTP GET message comprising an URL associated with the manifest file may be sent to a request routing RR node of the CDN (step 200). The request routing node may then redirect the message to the delivery node in CDN A (steps 202-204), which is configured to deliver the manifest file and the segments listed in the manifest file to the client. In response to the manifest request the delivery node DN1 in CDN A may send the manifest file to the client. Thereafter, the client may parse the manifest file (step 208), select a segment from the manifest file and request the selected segment on the basis of a segment locator (e.g. an URL) associated with the selected segment. The segment retrieval function in the client may evaluate the bandwidth that is available for delivering the requested segment to the client. In this particular case, sufficient bandwidth is available for requesting the high quality version of the segment (see also the manifest file depicted in FIG. 1B).

When delivery node D1 receives the request for a first segment "segment1-1.avi" (step 210), it may determine that the requested segment file is not available. Such situation may be referred to as a "cache miss" 212). The non-availability of the segments may have various reasons (as already discussed above). The determination of a cache miss may trigger a process to ingest the requested segment from another content origin, e.g. another CDN or a central content storage using e.g. a conventional HTTP request (steps 214-216). Once, the segment is ingested and delivered to the delivery node, the delivery node may send the requested segment to the client (step 218) that may start playout of the high quality segment while continuing the process of retrieving further segments on the basis of the manifest file. The ingestion process will cause a delay in the delivery of the requested segment to the client. These delays may increase even further if (some of) the segment locators in the manifest file need to be resolved in the network. Such resolving process may include DNS lookups and redirects which cause delays that add up to the delays due to cache misses.

The segment retrieval function in the client may have noticed that it took a relatively long time before the first segment was fully delivered to the client. On the basis of this information, the client may decide that there is no (longer) sufficient bandwidth available for delivering high-quality segments to the client and switch over to the playout of a low(er) quality version of the content (step 219). Hence, in that case the segment retrieval function may continue the segment retrieval process on the basis of second segment "segment2-2.avi" of a lower quality by sending a segment request comprising a segment locator associated with the second segment to the content delivery node (step 220). Also in this case, the segment may not be available so that another cache miss is determined (step 222). The cache miss may start again an ingestion process wherein the requested segment is ingested from a content origin. After ingestion, the requested low(er) quality segment is provided to the client that may start playout the second segment in a lower quality.

Hence, from the above, it follows that delays in the network due to cache misses and resolving processes may result in the client requesting and playout low quality segments, which may degrade the user experience. Ultimately, the occurrence of multiple subsequent cache misses may cause an interruption of the playout of the segments.

Figure 3A:
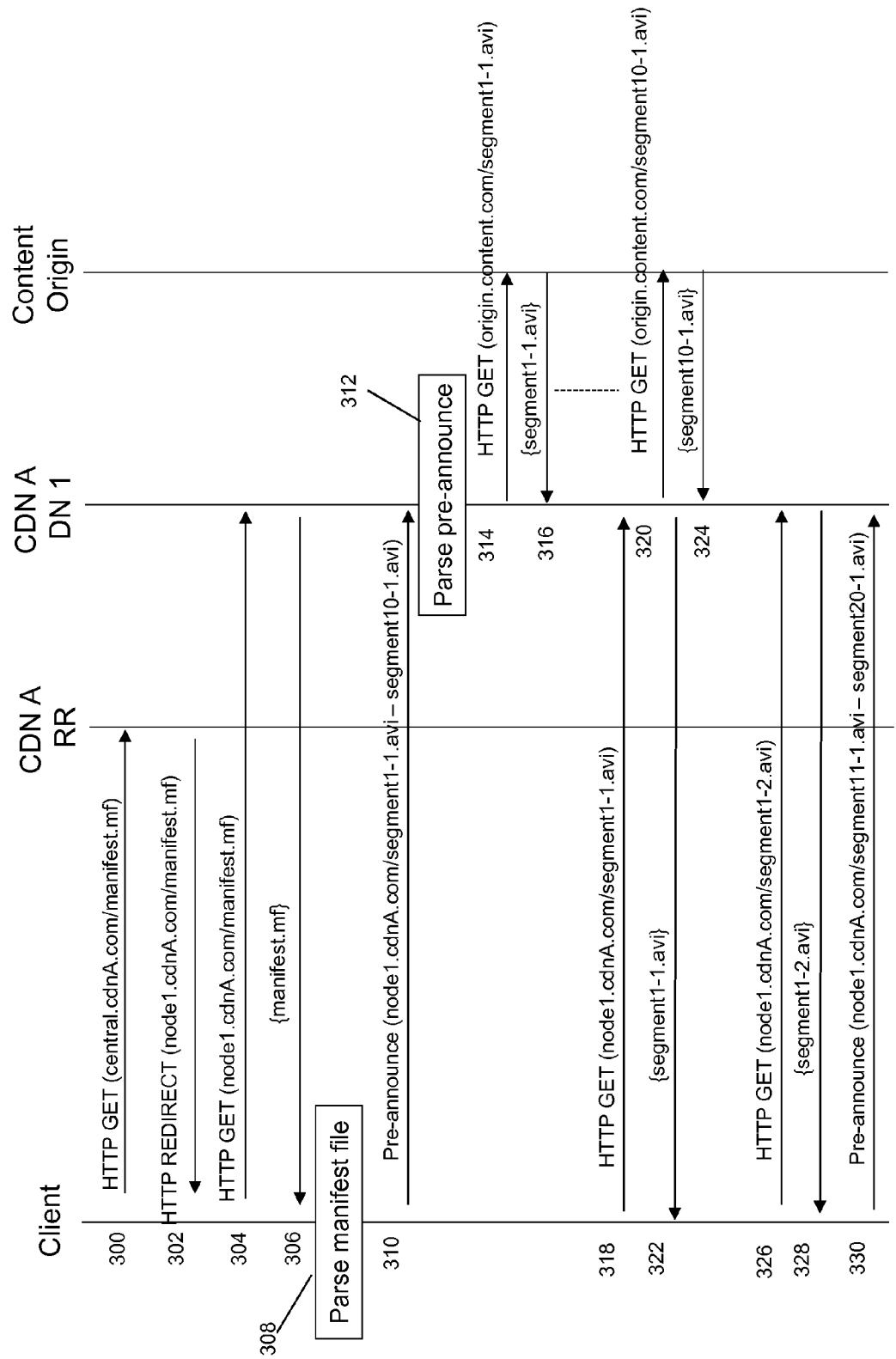

FIG. 3A depicts a protocol flow for streaming segmented content according to on embodiment of the invention. In particular, FIG. 3 depicts a flow diagram wherein the HAS client and the content delivery network are configured to minimize the delay that may occur between the client requesting a segment and the actual delivery of the requested segment.

The process may start with the retrieval of a manifest file from a delivery node (steps 300-306) in a similar way as described with reference to FIG. 2. Thereafter, the HAS client may parse the manifest file (step 308) and prepare a first pre-announce message for transmission to the network. The pre-announce message may comprise pre-announce information about segments that it is going to retrieve in the near future. The pre-announce information may comprise one or more segment identifiers. The segment identifiers may be associated with a delivery node that is designated for delivery of these segments to the client. For example, in FIG. 3A the pre-announce message that is sent to the delivery node (step 310) may comprise one or more URLs identifying segment files that are stored on the delivery node DN1. In a further embodiment, the pre-announce information may comprise a time period defining a period wherein said segment request is expected to be requested by said client.

After reception of the pre-announce message, the message may be parsed by the delivery node (step 312). In response to the pre-announce message, a cache control function in the delivery node may determine whether the segments identified in the pre-announce message are available on the delivery node. The cache control function may determine that the segments (or some of them) are not available. In that case, a process may be trigger for ingesting these segments from other content origin. For example, a dynamic ingestion process may be triggered wherein the delivery node (or the request routing node) requests a content origin the missing segments (steps 314-316). These segments may be delivered by content origin to the delivery node.

Alternatively, the cache control function may determine that the segments (or some of them) are available but are going to be removed from the cache within a predetermined period e.g. because the segments have been stored at the cache for a period that is longer than a predetermined maximum storage time. In that case, the cache control function may extend the maximum storage time for those segments. This way, the cache control function will not remove these segments from the cache so that they are available for request by the client.

Meanwhile, the client may start the process of requesting a first segment from the delivery node (step 318 and 322). Because pre-announce message already took care that the first segments in the manifest file are in fact available for request, the segments can be readily delivered to the client. The ingestion process of segments (steps 320 and 324) may be continued during the time the client requests the delivery of segments (step 318 and 322) so that delays due to cache misses are eliminated or at least substantially reduced.

Once the ingestion process of the segments associated with the first pre-announce message is finished, a second pre-announce message comprising further segments from the manifest file may be sent to the delivery node so that during the segment retrieval process, the segments are available on the delivery nodes.

The pre-announce message as described above may be sent to the network in various ways. In one embodiment, the pre-announce message may be implemented as an HTTP message. In an embodiment, the pre-announce message may be implemented as a HEAD message comprising a segment locator (URL) of a segment which the client is likely going to request in the near future.

In order for the content delivery network (or the request routing node and/or delivery nodes) to distinguish between standard HTTP messages and HTTP messages that serve as a pre-announce message for a delivery node or a content delivery network, the header of the HTTP message may comprise a field comprising a pre-announce indicator that signals the delivery node or the content delivery network that the message should be interpreted as a pre-announce message. The pre-announce indicator may be part of the pre-announce information that is needed for a delivery node or a CDN to distinguish between standard HTTP messages and HTTP messages that serve (amongst others) as a pre-announce message. Alternatively, one or more types of HTTP messages, e.g. all HEAD messages, may be considered by the delivery node or the content delivery networks as pre-announce messages.

In one embodiment, the indicator may be a flag, e.g. a binary flag. In another embodiment, the indicator may be a token. The token may be segment and/or user specific. In an embodiment, (at least part of) the segment identifiers may be associated with a token. When the client prepares a pre-announce message, the client may select one or more segment identifiers and associated tokens from the manifest file, wherein the segment identifiers are associated with segments that the client may request within a predetermined time period. Thereafter, the client may sent HTTP message comprising at least one segment identifier and a token as a pre-announce indicator to the delivery network or the content delivery network.

In a further embodiment, the pre-announce indicator may be realized on the basis of an (HTTP) cookie. In that case, the delivery node or the content delivery network may send a set-cookie instruction to a (cookie-enabled) client. In an embodiment, the set-cookie instruction may be sent to the client over a separate communication channel such as a (Websocket-based) HAS control channel as described hereunder with reference to FIG. 12. Alternatively, The cookie may comprise pre-announce cookie value representing a pre-announce indicator that can be detected and interpreted by the delivery node or the CDN. The cookie value may be specific for the domain wherein the cookie is valid. In an embodiment, the domain may be a segmented content item (as defined in a manifest file), a specific representation of a segmented content item (as defined in the manifest file) or one or more individual segments.

When a client sends an HTTP message for the domain to a delivery node or the CDN, it sends the pre-announce cookie value along with the HTTP message to the delivery node or the CDN so that this HTTP message is interpreted by the delivery node or the content delivery network as a pre-announce message. In an embodiment, the client may insert the pre-announce cookie value in the cookie header filed of an HTTP message, e.g. an HTTP HEAD. This way, delivery node or the CDN, in particular the request routing node of the CDN, may check the cookie header of the HTTP message for a pre-announce cookie value. If the message does not comprise a pre-announce cookie value, the delivery node or the CDN may interpret the message as a standard HTTP message.

The advantage of this embodiment is that it allows the network to dynamically (de)activate and/or adjust the pre-announce function at any time using the set-cookie instruction.

In an embodiment, the pre-announce message may be implemented as an HTTP GET message that comprises a pre-announce indicator and a segment identifier and/or locator (URL) of a segment that the client is requesting, wherein the HTTP header of the GET message further comprises one or more segment identifiers and/or locators associated with one or more segments that the client is (likely) going to request in the near future.

In yet another embodiment, the pre-announce message may be implemented as an HTTP GET or POST message wherein the header with a pre-announce indicator and wherein the body may comprises one or more segments locators that the client is (likely) going to request in the near future. The one or more segment identifiers and/or locators may be stored in an XML or JSON format. Further, one or more segment identifiers and/or locators may also be stored in the body of an HTTP GET message as a list of sub HTTP requests.

Alternatively, the pre-announce messages may be sent to the network via a separate communication channel. In one embodiment, such separate communication channel may be established on the basis of the WebSocket protocol. The process of establishing a WebSocket channel is described hereunder in more detail with reference to FIGS. 11 and 12.

FIG. 3B and FIG. 3C depict flow diagrams of streaming processes at the client side according to two embodiments of the invention. In FIG. 3B, the process may start with the HAS client requesting a manifest file associated with a video title (step 300). After having received the manifest file (step 301), the client may start the playout of the video. After starting playout of a segment (step 302), the client may determine one or more segments identifiers (a set of segments) in the manifest file that are (most likely) going to be requested within a predetermined period (step 303). The client may then prepare a pre-announce message comprising the one or more segment identifiers and send the pre-announce message to the CDN (step 304). If the pre-announce message is received by the CDN, the CDN will take care that the segments are available to the client. Here "available to the client" means that the segment is located and stored on a delivery node when the client makes the request for the segment. The pre-announcement process may be repeated for further sets of segments until the playout of the video is finished (step 305). The process in FIG. 3C is similar to the one in FIG. 3B with the exception that the first pre-announcement message is sent to the network before video playout. This way cache misses are avoided throughout the playout of the video. The process in FIG. 3B provides fast initial playout, however the risk exists that at the start a delay due to a cache miss is encountered.

Figure 4:
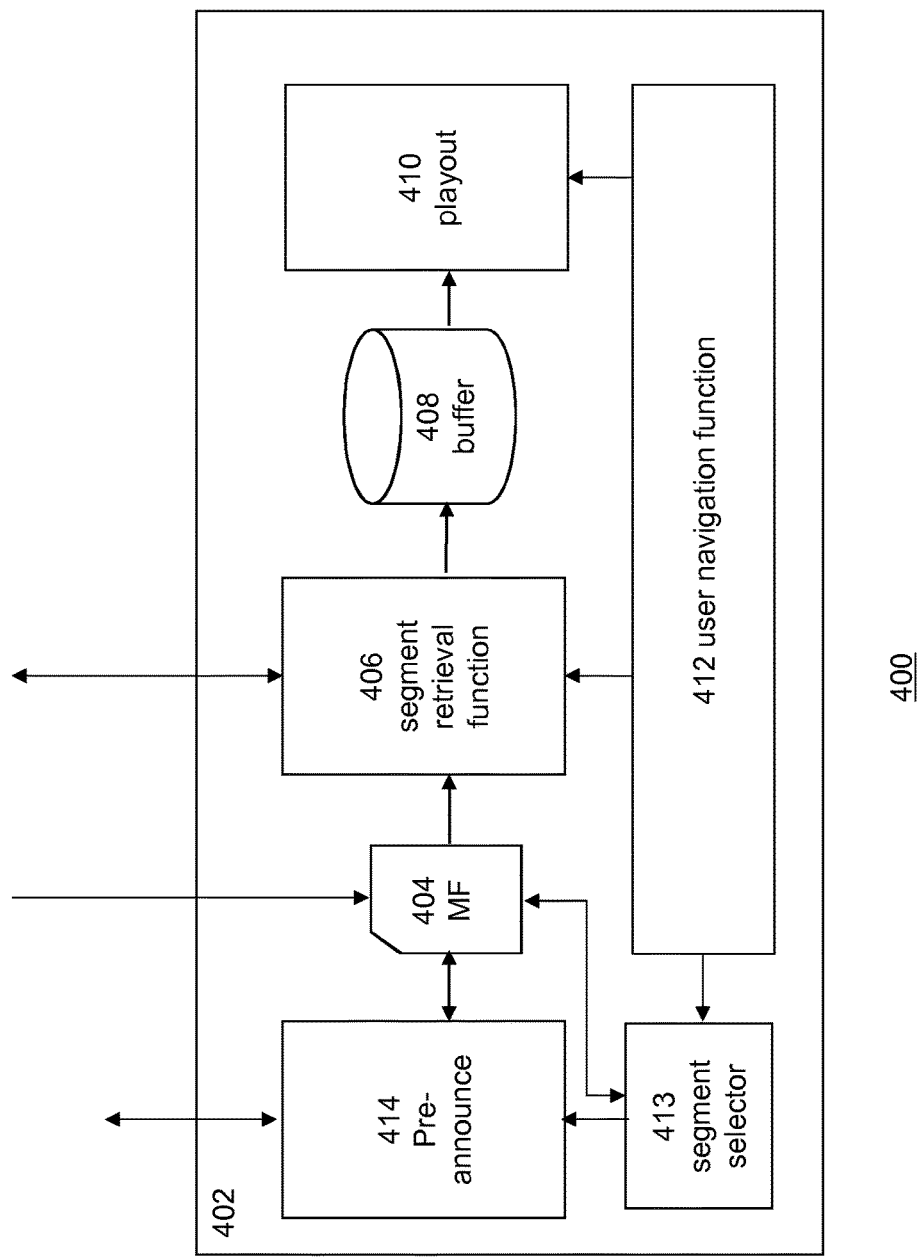
FIG. 4 depicts an HAS client for playout of segmented content according to one embodiment of the invention.

FIG. 4 depicts an HAS client for playout of segmented content according to one embodiment of the invention. In particular, FIG. 4 depicts an HAS client comprising a (segment) pre-announcement function 414 which is configured to generate one or more pre-announce messages comprising segment identifiers that are listed in the manifest file. In one embodiment, the pre-announcement function may be configured to generate one or more pre-announce messages comprising segment identifiers of segments that are expected to be selected by the client for playout in the near future.

In order to predict such segments, a segment selector 413 may use user navigation information from the user navigation function 412 in order to select at least one segment from the segment list stored in the manifest case 404. This process will be described hereunder in more detail. The client may further comprise a segment retrieval function 406, a segment buffer 408 (a cache) and a video play-out function 410 (media engine) similar to those described with reference to FIG. 1A.

On the basis of the segment that is played-out and on the basis of the user navigation information provided by the user navigation function, the segment selector may predict which segment(s) is(are) most likely to be selected for playout by the client in the near future, i.e. within a predetermined time period. The user navigation information may provide contextual information, i.e. information that is user-specific (e.g. the user profile, the user navigation history, the (geo) location of the user, etc.), which is used by the segment selector for predicting future segment playout.

The pre-announcement function may also use general navigation information associated with the played segmented content, e.g. information regarding frequently requested segments associated with a particular content item. This general navigation information may be used together with the user navigation information in order to predict future segment play-out. In one embodiment, a content provider or a control function in the CDN may insert general navigation information in the manifest file (e.g. segments that are marked as popular) when it is delivered to a client. This embodiment is described in more detail with reference to FIG. 10B. In another embodiment, the pre-announcement function may receive general navigation information via another communication channel from the content provider, the CDN or a third party.

If the predicted segment(s) is(are) not in the segment buffer, the announcement function may start sending one or more pre-announce messages comprising segment identifiers of the predicted segments(s) to the network in order to announce the CDN that these segments will be requested within the near future. On the basis of the pre-announce message the CDN (or a delivery node in the CDN) may start ingestion of segments that are mentioned in the pre-announce message if the CDN (or the delivery node in the CDN) has determined that at least some of the segments identified in the pre-announce message are not available in the CDN.

Figure 5:
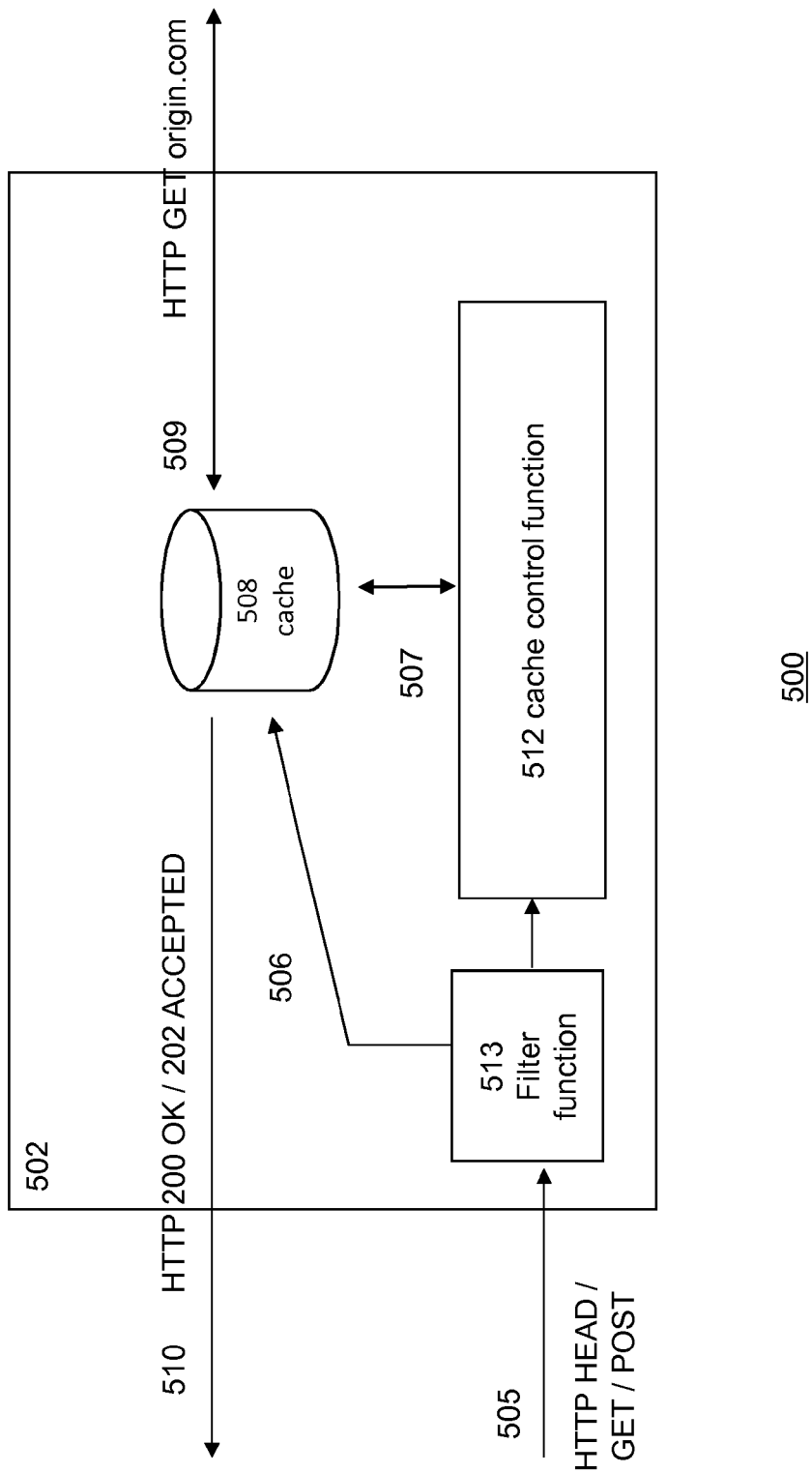
FIG. 5 schematically depicts a network node for streaming segmented content according to an embodiment of the invention.

FIG. 5 schematically depicts a network node for streaming segmented content according to an embodiment of the invention. In particular, FIG. 5 schematically depicts a network node 502 comprising a cache 508, (a storage medium) for storing segments files and a cache control function 512 for controlling the ingestion and storage of segments and the delivery of segments to clients. The network node (that may be part of a content delivery network) may be configured to receive request messages, e.g. HTTP request messages such as HTTP HEAD, HTTP GET or HTTP POST from one or more clients or a request routing node of the CDN. The cache control function is configured to be triggered by a pre-announce message comprising pre-announce information to ensure availability of segments in the pre-announce information.

In some embodiments the network node may comprise a filter function 513. In case the pre-announce messages are implemented as an HTTP message such as an HTTP HEAD, GET or POST message (as described above), a filter function 513 in the delivery node may be used in order to allow the delivery node to distinguish between HTTP request messages 506. The filter may distinguish between standard HTTP messages and special pre-announce HTTP messages by checking the presence of a pre-announce indicator in (the header of) the message. If the request message is a standard HTTP request messages (an HTTP request associated with a conventional segment request), the requested segment is selected from the cache 506 and sent to the client 510 that has requested the segment. If the request message is a "special" (HTTP) request messages that comprises pre-announce information (including a pre-announce indicator) and/or that should be interpreted by the delivery node as a pre-announce message (e.g. in case de CDN should interpret a certain HTTP message such as a HTTP HEAD message as a pre-announce message), the filter makes sure that the message is forwarded to the cache control function 512 that is triggered to check the availability of a segment 507 and, if the segment is not available, to trigger a segment retrieval process 509 (e.g. a content ingestion process) in order to retrieve the segment from a content origin. In case the pre-announce message is a message that is distinct from the other messages or if a separate communication channel is used for transmitting the pre-announce messages to the network, it is not necessary to use the filter function.

In an embodiment, the cache controller may comprise a cache algorithm that keeps track of the segments that are stored in the cache and that removes segments from the cache according to a certain rules. The cache controller may assign a time (e.g. a timestamp) to a segment that is stored in the cache so that the cache controller may determine the storage time of a segment in the cache. If a segment is stored for a period longer than a predetermined (maximum) period, the cache controller may remove the segment from the cache. In some embodiment, the cache controller may keep track of the number of times a segment is requested within a certain period. Segments that are requested many times (popular segments) may be stored for a longer period in the cache than less popular segments. This way, the cache controller ensures that old and less-popular segments are removed from the cache.

In an embodiment, if the cache controller is triggered to check the availability of a segment and it determines that it is available but that the segment will be removed from storage by the cache algorithm within a predetermined time, the cache controller may prolong the storage time of that segment so that availability of the segment is ensured.

In some embodiment the filter function may be implemented in another network node, e.g. a separate stand-alone node or in the request routing node of a content delivery network.

Figure 6:
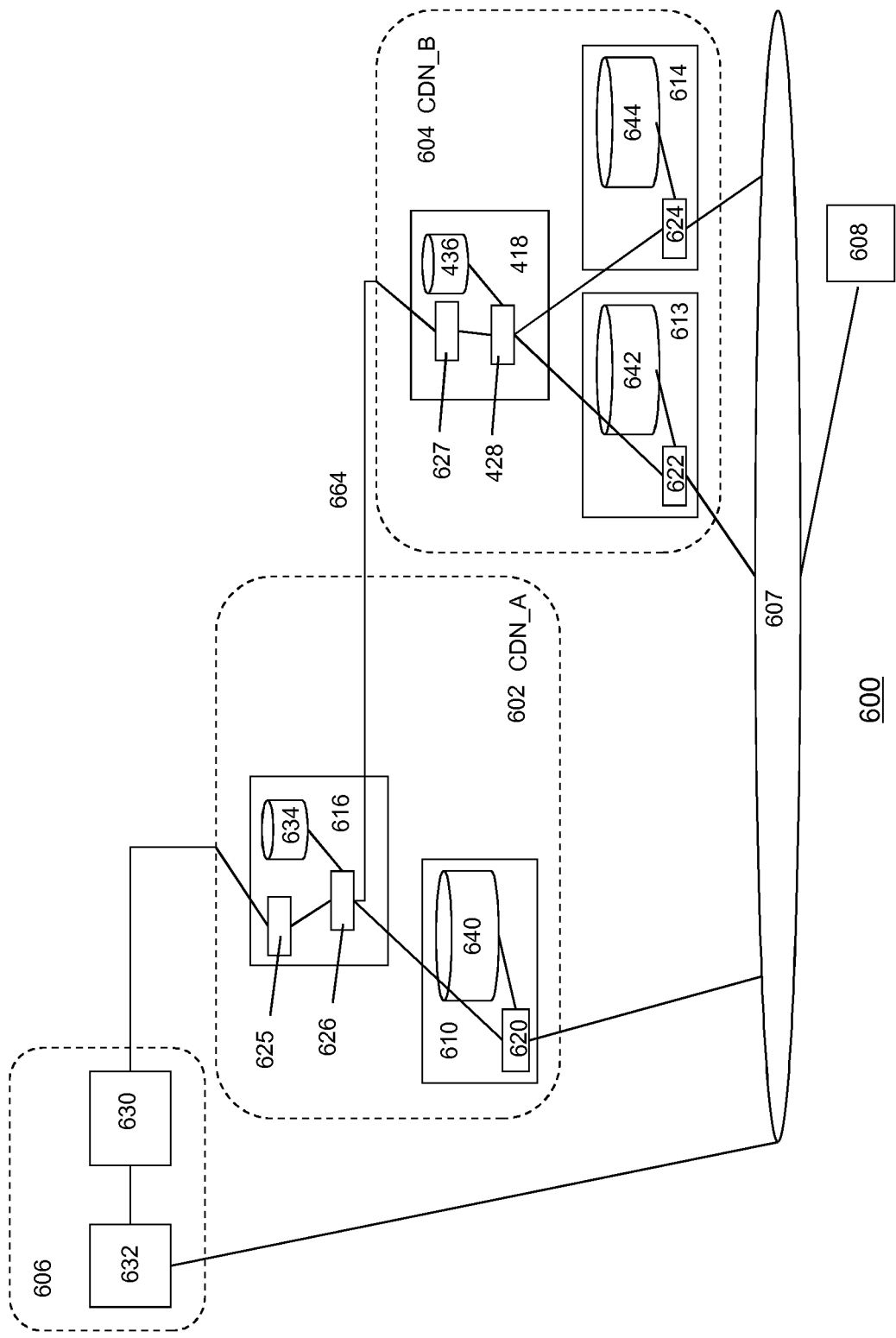
FIG. 6 depicts a system for streaming segmented content according one embodiment of the invention.

FIG. 6 depicts a system for streaming segmented content according one embodiment of the invention. In particular, FIG. 6 illustrates a CDN-based content delivery system comprising a first CDN 602 (also referred to as the upstream CDN) interconnected via an CDN interconnect interface 664 to at least a second CDN 604 (also referred to as the downstream CDN).

The content delivery system may further comprise a content source 606 connected via a transport network 407 to one or more terminals 608 hosting a client. The content source may relate to a content provider system CPS, a content preparation system or another CDN. A CPS may be configured to offer content, e.g. a video title, to customers, which may purchase and receive the content using an HAS client as described with reference to FIG. 4 for video play-out.

A CDN may comprise delivery nodes 610,613,614 as e.g. described with reference to FIG. 5 and at least one central CDN node 616,618. Each delivery node may comprise or be associated with a controller 620,622,624 and a cache 640, 642,644 for storing and buffering content. Each central CDN node may comprise or may be associated with an ingestion node (or content origin function, COF) 625,627 for controlling ingestion of content from an external source, e.g. a content provider or another CDN, a content location database 634,636 for maintaining information about where content is stored within a CDN and a CDN control function (CDNCF) 626,628 for controlling the distribution of one or more copies of the content to the delivery nodes and for redirecting clients to appropriate delivery nodes (a process also known as request routing). The node hosting the CDNCF may be referred to as the request routing (RR) node. A customer may purchase content, e.g. video titles, from a CPS 630 by sending a request to a web portal (WP) 632, which is configured to provide title references identifying purchasable content items. The CDNCF may manage the locations where segments may be retrieved using the content location database 634,636.

In the content delivery system of FIG. 6, the upstream CDN may outsource part of the delivery of segments to a client to the downstream CDN. For example, in one embodiment, low-quality segments may be located and delivered by a first CDN A (configured e.g. for delivery of content to mobile devices) and high quality segments may be located and delivered by a second CDN B (configured e.g. for delivery of high-quality segments to home media devices supporting HDTV technology).

Figure 7:
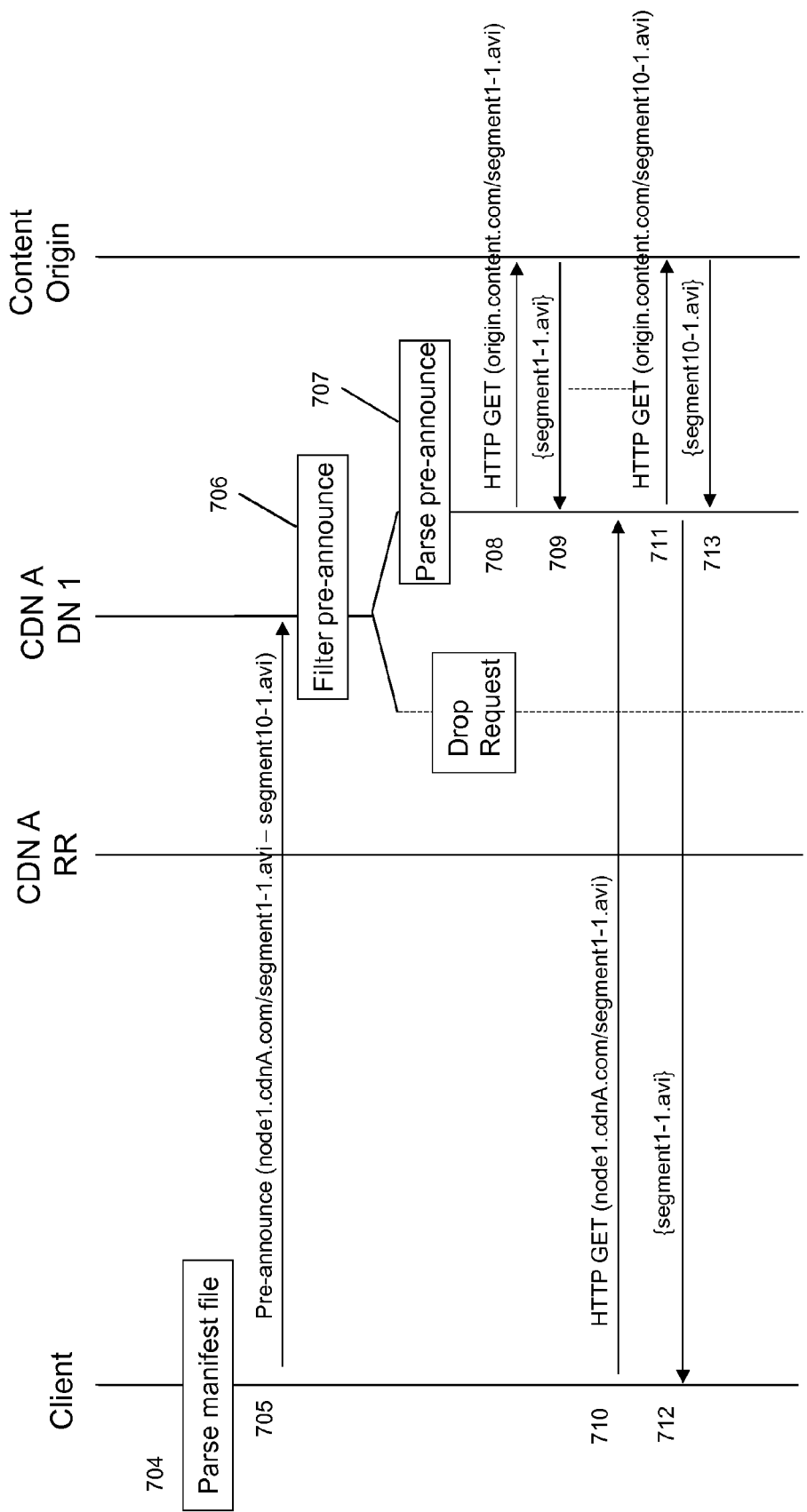
FIG. 7 depicts a protocol flow of a streaming process of segmented content according to another embodiment of the invention.

FIG. 7 depicts a protocol flow of a streaming process of segmented content according to another embodiment of the invention. The process may start with the delivery of a manifest file in a similar way as described with reference to FIG. 3A. The manifest file may be parsed by the HAS client (step 704), which thereafter prepares a pre-announce message that comprises a set of segment identifiers (URLs) and sends the pre-announce message to said the content delivery network, in particular a content delivery network in said content delivery network (step 705).

In this particular embodiment, the delivery node may keep track of the segments that have been ingested by the content delivery network within a predetermined period. Hence, when a second pre-announce message for the same segment from another HAS client has been received, the pre-announce message may be dropped (i.e. filtered out) so that a segment is not ingested twice in the same period. If the pre-announce message is not dropped, the message is parsed and an ingestion process may be started in a similar way as described with reference to FIG. 3A. This way only the first pre-announce message in a period triggers a further action, e.g. a ingestion process similar to the process described with reference to FIG. 3A or, alternatively, an extension of the (maximum) storage time of a segment that was about to be removed from the cache. In a further embodiment, pre-announce messages may be filtered out in order to avoid an overload of the delivery node or origin server.

Figure 8A:
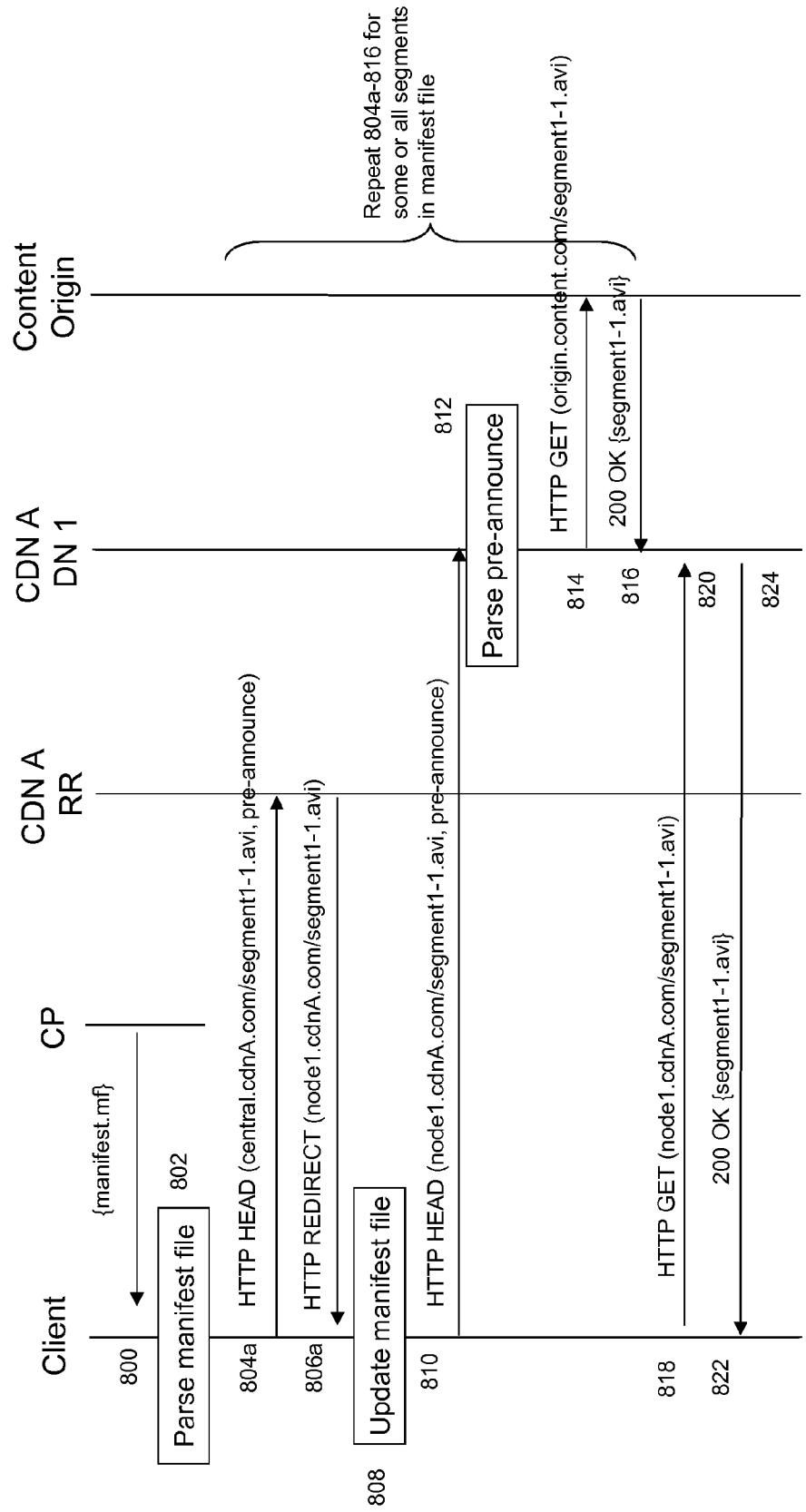
FIGS. 8A and 8B depict protocol flows of a streaming process of segmented content according various embodiments of the invention.
Figure 8B:
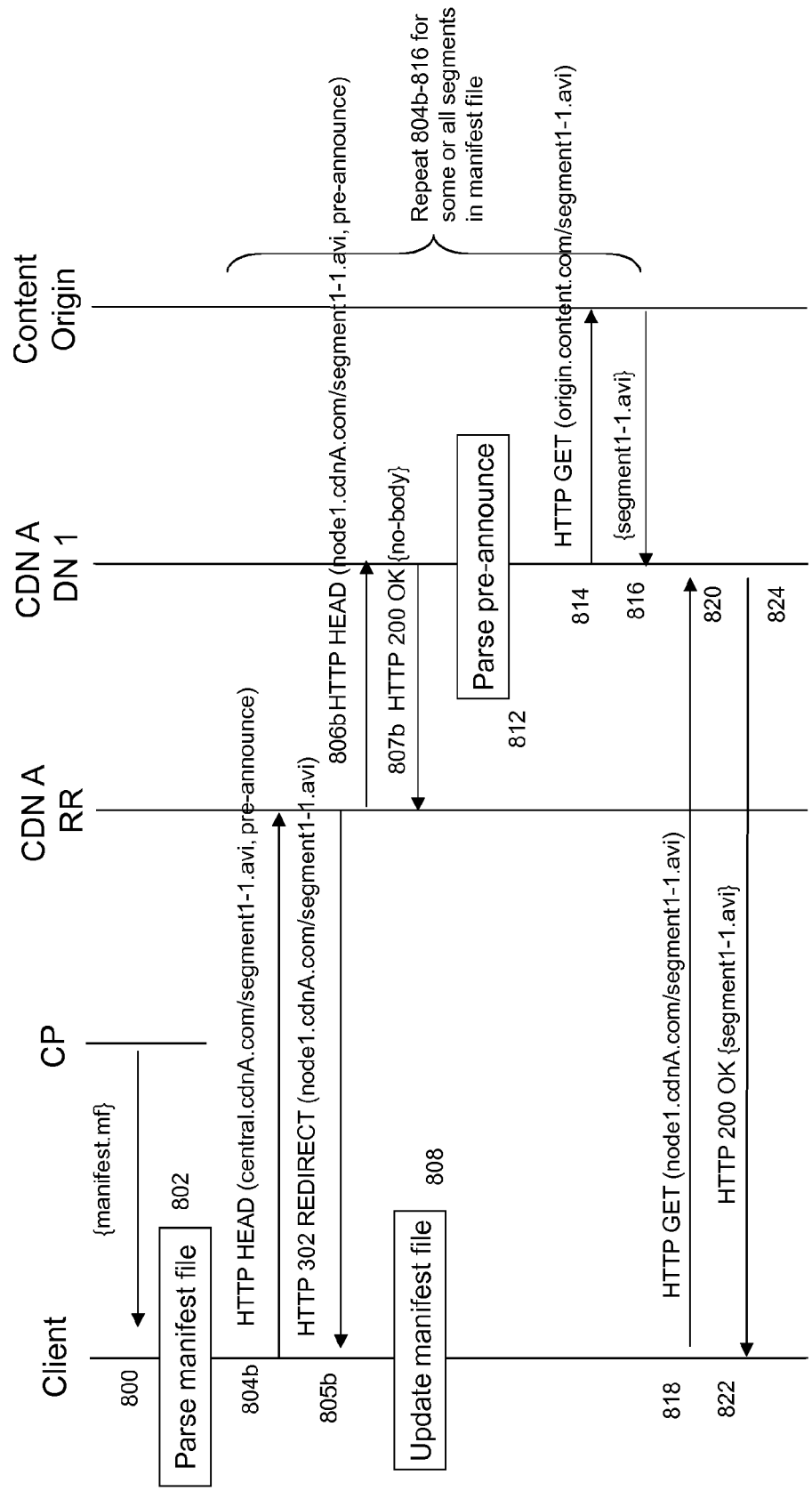

FIGS. 8A and 8B depict protocol flows of a streaming process of segmented content according various embodiments of the invention. The process of FIG. 8A may start with a content provider (CP) providing a manifest file (step 800) associated with a video title to the HAS client. In this case, the manifest file may comprise segment identifiers and a pointer (e.g. URL) the request router of CDNA. After parsing the file (step 802), the client may prepare a pre-announce message in the form of a HTTP message, e.g. an HTTP HEAD message comprising a segment locator (URL) of a segment which the client is likely going to request in the near future. Further, the HTTP header of the HEAD message may comprises a field that comprises a pre-announce indicator that indicates that the HEAD message is a pre-announce message and that allows the CDN to distinguish between a standard HTTP message and a HTTP message that should trigger a cache control function in the CDN (e.g. a cache control function of a delivery node in the CDN) to ensure availability of said segment by said delivery node or content delivery node when said segment is requested by a client.

Thereafter the HEAD message is sent to the request routing node of the CDN (step 804a). In response to the HEAD message, the request routing node may send a HTTP REDIRECT message comprising location information associated with the delivery node on which the requested segment is stored (step 806a).

Upon receiving the REDIRECT message, the client may execute a DNS request to resolve the location information into an IP address of the delivery node (not shown). The client may update the manifest file (step 808) by inserting the IP address of the delivery node into the manifest file. Further, in response to the REDIRECT message, the client may use the address of the delivery node to resend the pre-announce message in the form of an HTTP HEAD message to the delivery node (step 810). The filter function of the delivery node may parse (determine) that the HEAD message is a pre-announce message (step 812) so that it may trigger the cache control function to start an ingestion process for ingesting the segment from a content origin (814,816).

Hence, in this example, the pre-announce message is not only used to announce to the delivery node that certain segments need to be available for delivery to a client within a predetermined time, but also to pre-resolve parts of the manifest file. The combination of the pre-announce and pre-resolving process allows fast and efficient processing of segmented content (i.e. requesting, delivering and playout of segments).

The process of FIG. 8B is similar to the process in FIG. 8A. In the process of FIG. 8B however, the request routing node forwards the message to the delivery node D1 in the content delivery network. Hence, the process of FIG. 8B may start with a content provider (CP) providing a manifest file (step 800) associated with a video title to the HAS client. In this case, the manifest file may comprise segment identifiers and a pointer (e.g. URL) the request router of CDNA. After parsing the file (step 802), the client may prepare pre-announce information in the form of a HTTP message, e.g. an HTTP HEAD message comprising a segment locator (URL) of a segment which the client is likely going to request in the near future. The HTTP header of the HEAD message may comprises a field that indicates that the HEAD message is a pre-announce message.

Thereafter the HEAD message is sent to the request routing node of the CDN (step 804b). In response to the HEAD message, the request routing node may sends a HTTP REDIRECT message comprising location information associated with the delivery node on which the requested segment is stored (step 805b). Upon receiving the REDIRECT message, the client may execute a DNS request to resolve the location information into an IP address of the delivery node (not shown). The client may update the manifest file (step 808) by inserting the IP address of the delivery node into the manifest file.

In this particular embodiment however, the client does not respond to the redirect with another HEAD message. Instead, in response to the HEAD message that comprises the pre-announce information, the request routing node may sent a HEAD message comprising pre-announce information to the delivery node that comprises the requested segment (step 806b). The delivery node may respond to the HEAD message with an 200 OK message (step 807b). Hence, this way, the pre-announce message is received by the delivery node which may parse the information (step 812) and verify whether the segments that are identified in the pre-announce message are available to the client. Thereafter, the process (steps 814-824) may be identical to the process shown in FIG. 8A. This embodiment provides the advantage that part of the pre-announce processes takes place in the network thereby reducing the load on the client.

Figure 9:
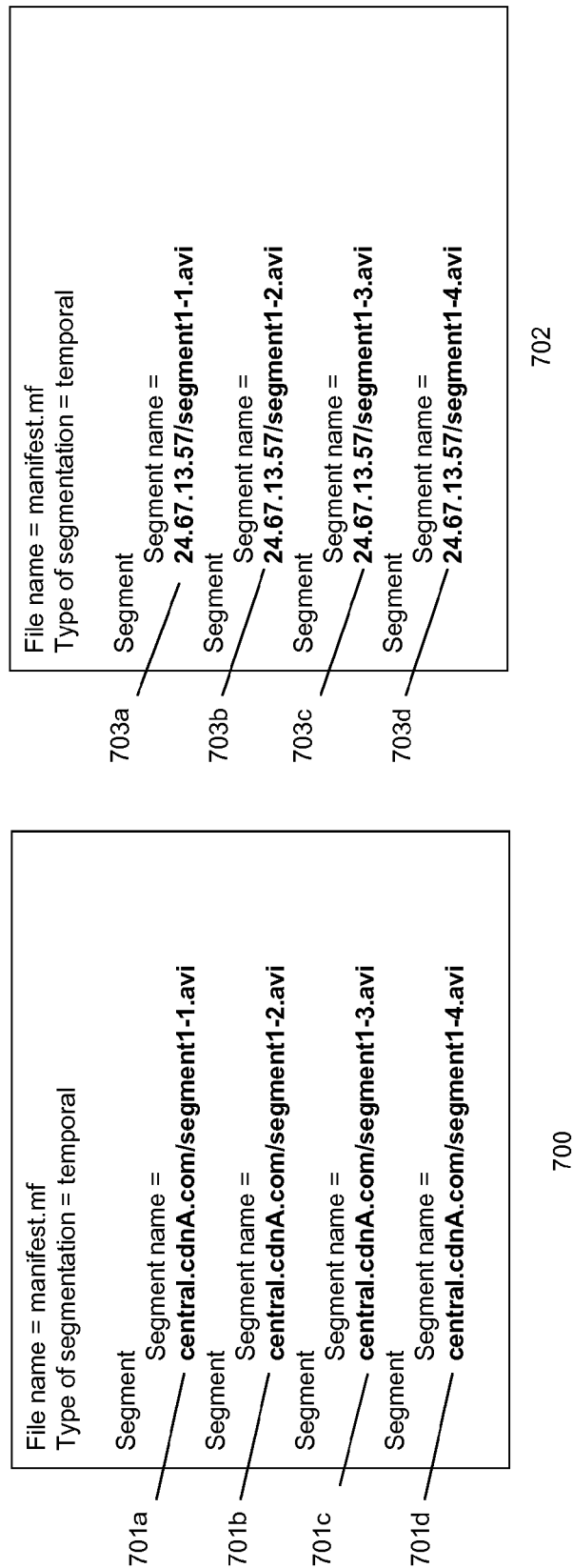
FIG. 9 depicts an example of pre-resolving segment locators of at least part of a manifest file according to one embodiment of the invention.

FIG. 9 depicts an example of pre-resolving segment locators of at least part of a manifest file according to one embodiment of the invention. In particular, FIG. 9 depicts an example of how a client may use the process of pre-announcing one or more segments that are highly likely going to be requested within a predetermined period of time in order to pre-resolve part of the information in the manifest file. The pre-resolving may include replacing segment locators, e.g. predetermined parts of URLs stored in the manifest cache of a terminal, with IP address of the delivery nodes. A first manifest file 700 may be received by the client from the content provider as described with reference to FIG. 8. In this case, the manifest file refers to a number of so-called temporally segmented content.

The manifest file in FIG. 9 indicates that it defines a temporally segmented content file comprising four segments defined by segment identifiers (file names) Segment1-1.avi, Segment1-2.avi, Segment1-3.avi and Segment1-4.avi are stored within the domain of CDN A. Here, a predetermined part of the URLs central.cdn_A.com (901a-901d) may point to a general Request Routing (RR) node within the CDN A. Hence, these segment locators are unresolved in the sense that do not comprise the network address of the nodes where a segment may be retrieved. When this manifest file is used by the client in a streaming process, during the pre-announce process, the segment locators may also be pre-resolved as described with reference to FIG. 8.

During the pre-resolving process, at least part of the unresolved segment locator central.cdn_A.com in the URLs 901a-901d associated with the four segments may be replaced by a network address. This way four resolved URLs 903a-903d may be formed each comprising the network address of the delivery node where these segments may be retrieved. The resolved URLs may point to e.g. one or more delivery nodes, some of which may be located in e.g. a further CDN B. As can be seen in FIG. 9, the segments may all be retrieved from one delivery node identified by network address 24.67.13.57.

Figure 10A:
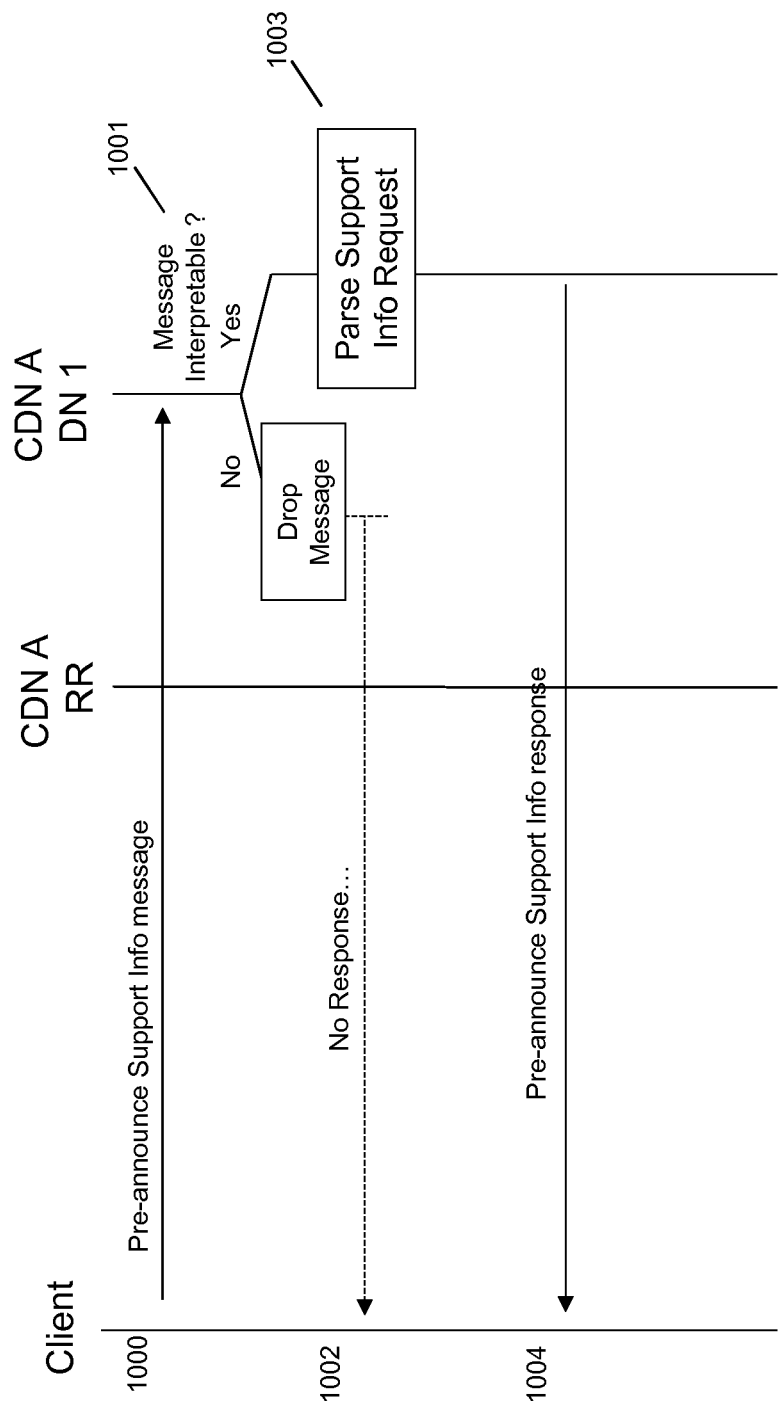
FIGS. 10A and 10B depicts a protocol flow and a manifest file respectively according to an embodiment of the invention.

FIG. 10A depicts protocol flow for requesting a network whether it supports the pre-announcement of segments that are expected to be requested by a client in the near future. In this process a pre-announce support info message may be send to the content delivery node (step 1000). If the filter is not able to interpret the message (step 1001) (or if there is not such a filter), the message is dropped and a negative response (e.g. an HTTP 40x response message, like 400—bad request or 405—method not allowed) or no response is sent back to the client (step 1002). Alternatively, if the pre-announce support info message is interpretable by the filter, the message may be parsed (step 1003) and a support confirmation response message, e.g. a pre-announce support (HTTP), may be sent back to the client (step 1004) so that the client knows that it may execute the pre-announcement process.

Figure 10B:
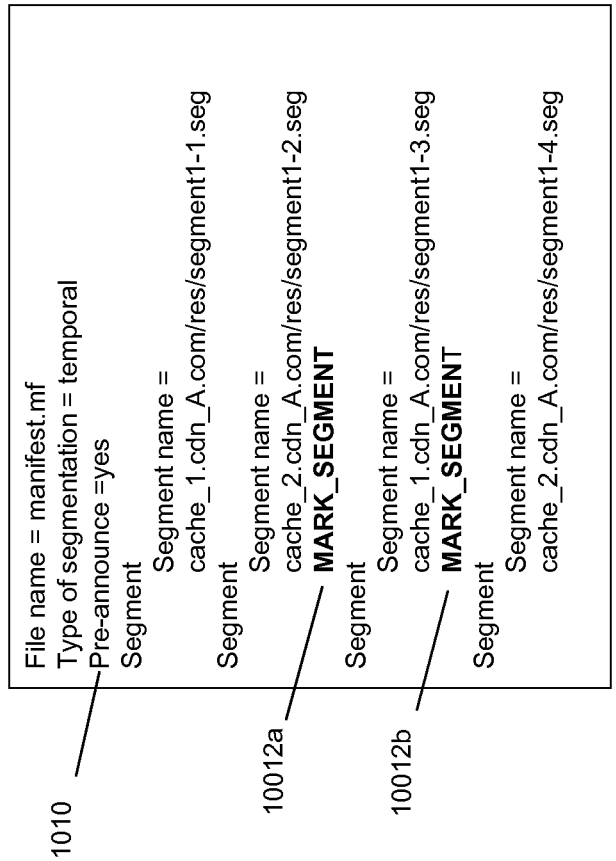

FIG. 10B depicts at least part of a manifest file according to an embodiment of the invention. The manifest file may comprise a pre-announce indicator 1010 that the CDN supports the pre-announce process and/or that a client needs to use its pre-announce functionality. Further, the manifest file may comprise an (unresolved) segment locator 1102 (as part of an URL). In this particular embodiment, a content provider or CDN provider may insert markers 1101a, 1101b for marking specific segment locators within a manifest file 1100. These markers may be inserted on the basis of segment navigation statistics so that popular segments, i.e. segments that are frequently requested, can be identified by the client on the basis of the markers in the manifest file. Such marker may identify one or more segment locators in the manifest file as being suitable for pre-announcement and (if desired) pre-resolution.

In one embodiment, markers may be associated with a ranking value, e.g. a popularity score, so that unresolved segment locators may be ranked in accordance with a ranking. These markers may thus provide a ranking scheme for the segment selector to select one or more further segments locators for future segment requests. This way unresolved segment locators associated with a high popularity score may be pre-resolved earlier than those with a lower popularity score. In one embodiment a content provider or a CDN may insert these markers into a manifest file. In another embodiment, a content provider or a CDN may generate a new marked manifest file.

As already briefly discussed above, the pre-announce process, and eventually the pre-resolve process, may be executed over a separate communication channel between the client and the CDN.

Figure 11:
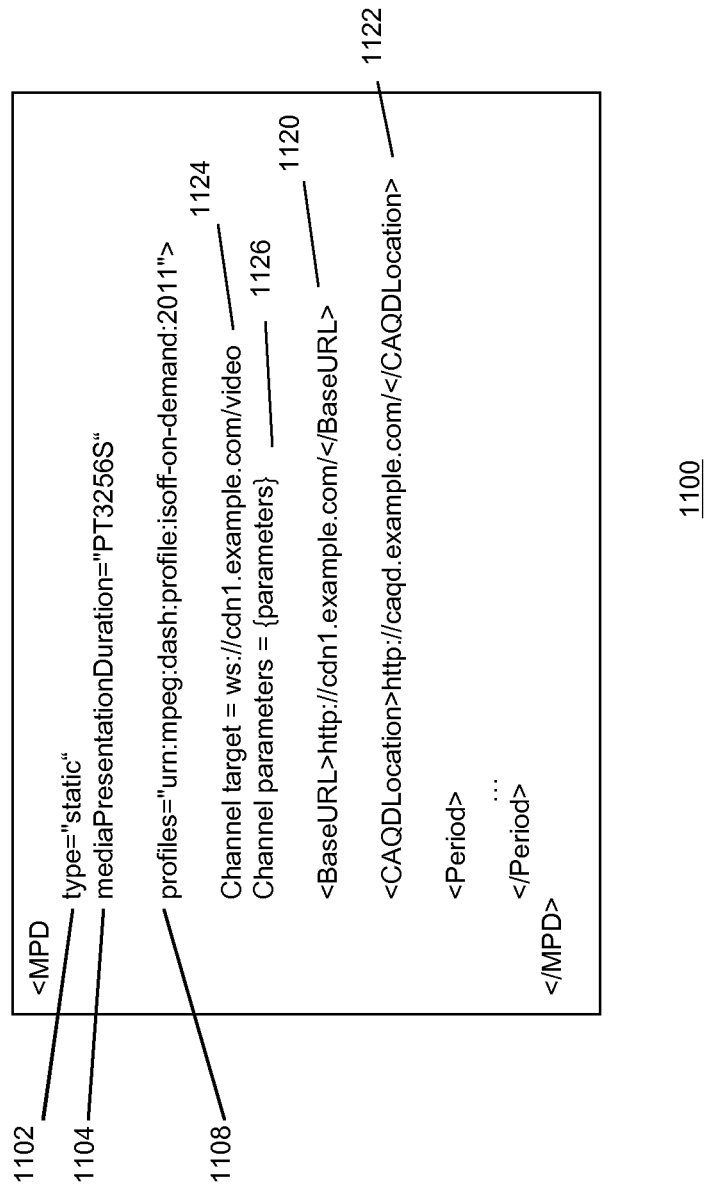
FIG. 11 depicts a manifest file comprising information for setting up a separate communication channel according to an embodiment of the invention.

FIG. 11 depicts a manifest file comprising information for setting up a separate WebSocket communication channel according to an embodiment of the invention. The manifest file may comprise channel set-up information 1124,1126 for setting up a communication channel, in particular a (bi-directional) HAS control channel, associated with the streaming path. In one embodiment, the channel set-up information may comprise a channel target parameter 1124 providing a reference to the network node comprising a streaming control function. Further, in another embodiment, the channel set-up information may comprise channel parameters 1102, i.e. parameters used by the streaming control function/control channel server function. For example, in the case of WebSocket the parameters may refer to the use of WebSocket sub-protocols, WebSocket version, etc. The set-up and use of a HAS control channel is described in more detail with reference to FIG. 12.

Figure 12:
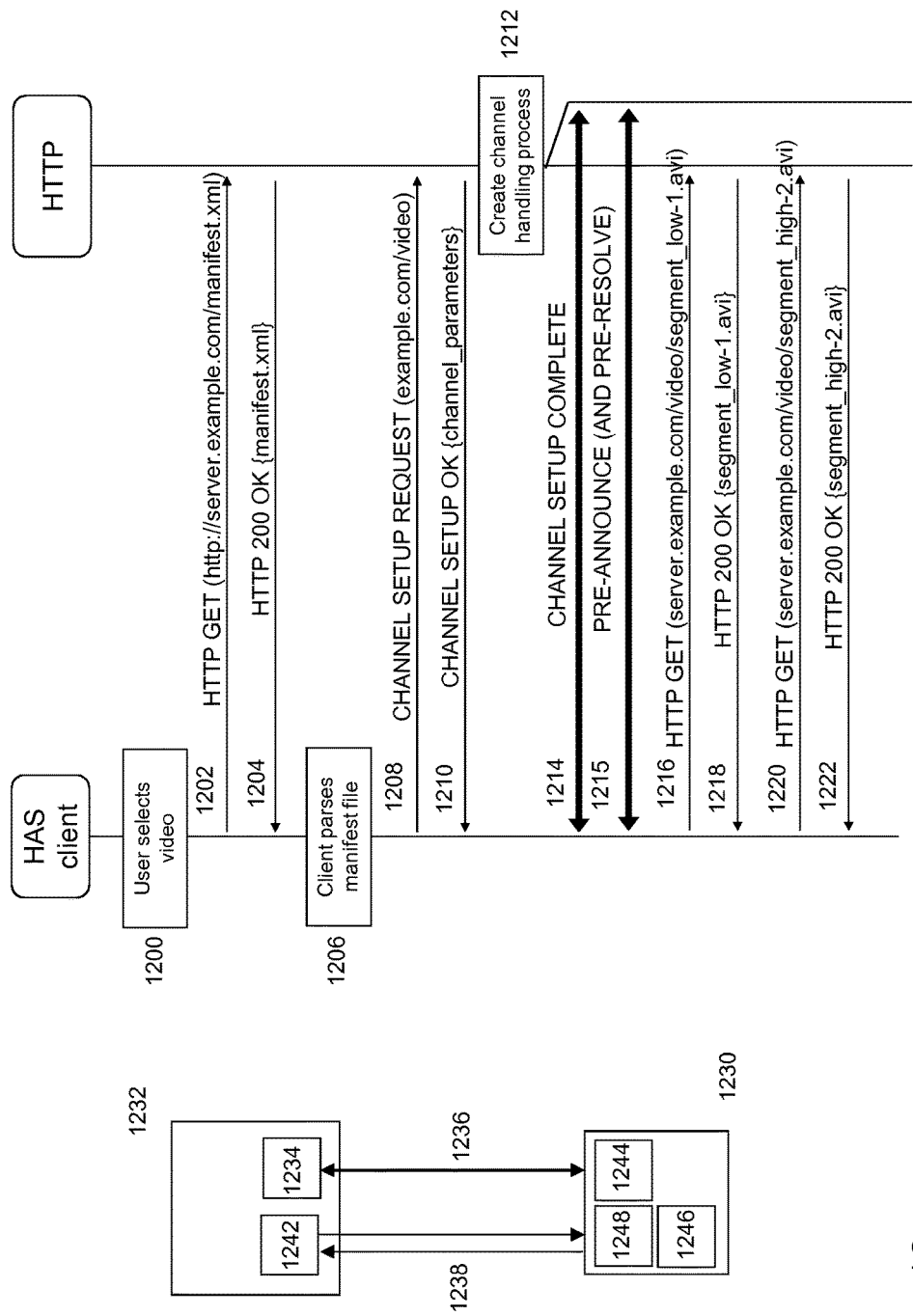
FIG. 12 depicts a protocol flow for establishing a bi-directional HAS control channel according to an embodiment of the invention.

FIG. 12 depicts a protocol flow between the content processing device 1230 and the server system 1232 that includes the establishment of a bi-directional HAS control channel according to an embodiment of the invention. The content processing device may comprise a HAS client 1248 and use a media engine 1246 for content playout. Similarly, the server system may comprise an HTTP streaming function 1242 for streaming content to the HAS client.

The content processing device and the server system may further comprise control channel client function (CCCF) 1244 and a control channel server function (CCSF), e.g. a HAS control channel server function 1234 respectively, which is configured to establish a streaming control channel 1236 between the CCSF and the CCCF 1244. Here, the streaming control channel may be used to exchange streaming control information between the client and the server. In particular, the streaming control channel may be used to send streaming control information originating from the server system to the client during the streaming of segmented content 1238 to the client. For example, in one embodiment, the streaming control channel may be used to send an update manifest trigger from the server system (or the monitoring system) to the CCCF so that the client will send a request for a manifest file (or an manifest update) to the server system.

In another embodiment, the control channel may be used for pre-announce messages. Here, the process may start in similar ways as described above with reference to the other processes, e.g. a user joining a live streaming event (step 1200). The client may send an HTTP GET request to obtain a manifest file from the server system, which may respond to the request by sending a manifest file to the client (step 1202,1204).

The CCSF in the server is configured to insert channel set-up information in the manifest file, which allows the CCCF in the client and the CCSF in the server to set up a streaming control channel. Hence, during parsing of the manifest file (step 1206), the channel set-up information may be extracted from the manifest file (see e.g. FIG. 11) and used by the CCCF in the content processing device to send channel setup request to the CCSF in the server (step 1208) for setting up a server-to-client streaming control channel.

In one embodiment, the CCCF and the CCSF may comprise an HTTP WebSocket API configured to use the WebSocket protocol and the channel set-up information to set up a streaming control channel between the client and the server. The WebSocket connections typically use standard HTTP ports 80 and 443 so that data may easily transfer firewalls and NATs, but also other ports may be used.

The use of the WebSocket protocol has several advantages within the context of CDN and HAS, such as a low message overhead for scalability, the use of the HTTP for protocol convergence and traversal of firewalls, and possibility for tunnelling of other protocols. In another embodiment, the Session Initiation Protocol (SIP) (http://tools.ietf.org/html/rfc3261) may be used, where the client may comprise a SIP User Agent and the server is a SIP Application Server.

In yet another embodiment, the Extensible Messaging and Presence Protocol (XMPP) (http://www.ietf.org/rfc/rfc3920.txt) is used, where the client may comprise an XMPP client and the server comprises an XMPP server. Both the SIP and XMPP protocol messages may be tunnelled over a WebSocket according to draft-ibc-rtcweb-sip-websocket-00 and draft-moffitt-xmpp-over-websocket-00.

During set-up of the streaming control channel, channel parameters may be exchanged between the CCCF and CCSF (step 1210). Furthermore, in order to handle messages originating from the client, the CCSF may create a dedicated channel handling process (thread) (step 1212). Once the streaming control channel is established 1214, the client may start the process of pre-announcing and, optionally, pre-resolving, one or more segment that are identified in the manifest file. Meanwhile the streaming process may be started with a HTTP GET request comprising an URL associated with the first segment segment_low-1.avi (step 1216). Once the delivery of the first segment is confirmed by a HTTP 200 OK response (step 1218), the client may request a subsequent segment segment_high-2.avi (steps 1220, 1222).

In an embodiment, the streaming control channel may allow the network to control the pre-announcing function in the client. For example, the content delivery network may activate or deactivate the pre-announcing function depending on certain parameters or circumstances. For example, the network may turn the pre-announcing function on if certain segments became (suddenly) popular. In an embodiment, a delivery node or a content delivery network network may send the client an updated manifest file comprising information that is similar to the manifest file in FIG. 10B wherein the pre-announce indicator instructs the client that the CDN supports the pre-announce process and/or it needs to use its pre-announce functionality.

In one embodiment, instead of transferring the channel set-up information in the manifest file, the channel set-up information may be pre-installed into the terminal or may be retrieved via a separate communication channel from another (network) source. In that case, when the client receives the manifest file, it triggers the streaming control channel client function to retrieve the channel set-up information in order to establish a streaming control channel as described with reference to FIG. 12 steps 1208-1214.

In another embodiment, the server system may be configured to stream segments to multiple clients, wherein each client is associated with its own streaming control channel in order to enable network-initiated, e.g. server-initiated, control as described with reference to FIG. 12.

It is to be understood that any feature described in relation to any one embodiment may be used alone, or in combination with other features described, and may also be used in combination with one or more features of any other of the embodiments, or any combination of any other of the embodiments.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Figure 13:
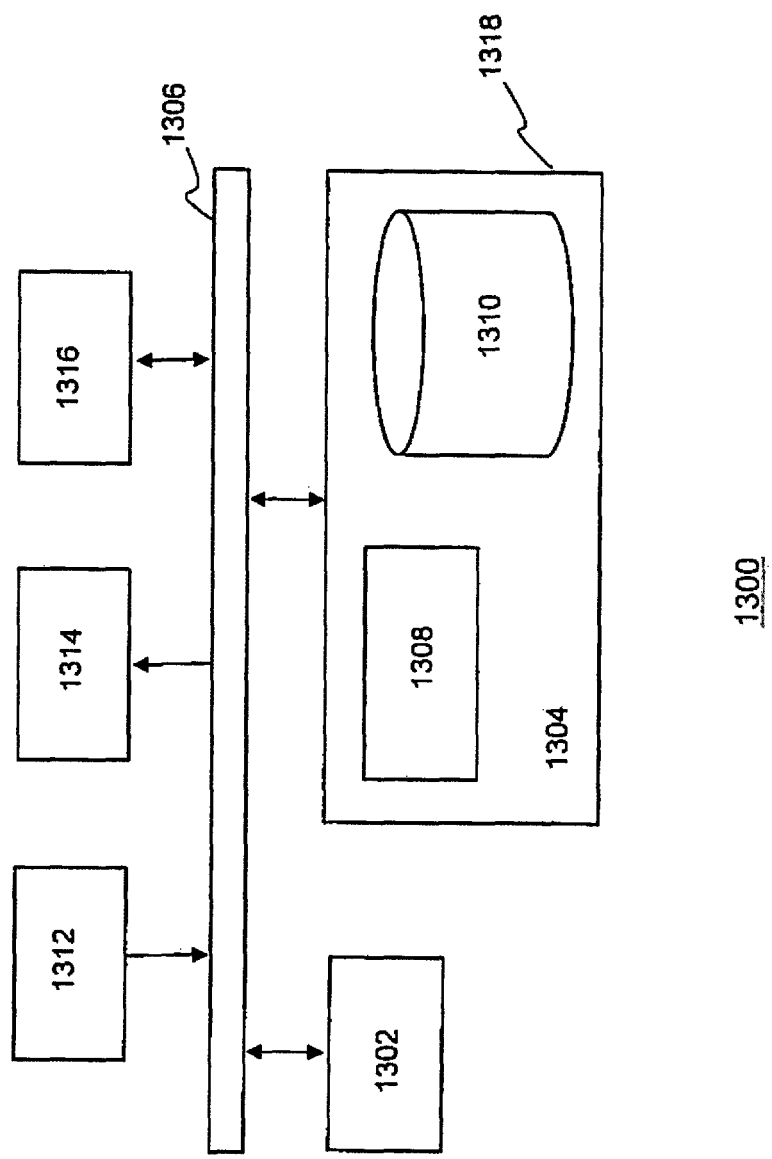
FIG. 13 depicts an exemplary device structure or server system, preferably a network node, structure

FIG. 13 is a block diagram illustrating an exemplary data processing system that may be used in systems and methods as described with reference to FIG. 1-12. Data processing system 1300 may include at least one processor 1302 coupled to memory elements 1304 through a system bus 1306. As such, the data processing system may store program code within memory elements 1304. Further, processor 1302 may execute the program code accessed from memory elements 1304 via system bus 1306. In one aspect, data processing system may be implemented as a computer that is suitable for storing and/or executing program code. It should be appreciated, however, that data processing system 1300 may be implemented in the form of any system including a processor and memory that is capable of performing the functions described within this specification.

Memory elements 1304 may include one or more physical memory devices such as, for example, local memory 1308 and one or more bulk storage devices 1310. Local memory may refer to random access memory or other non-persistent memory device(s) generally used during actual execution of the program code. A bulk storage device may be implemented as a hard drive or other persistent data storage device. The processing system 1300 may also include one or more cache memories (not shown) that provide temporary storage of at least some program code in order to reduce the number of times program code must be retrieved from bulk storage device 1310 during execution.

Input/output (I/O) devices depicted as input device 1312 and output device 1314 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1316 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1350.

As pictured in FIG. 13, memory elements 1304 may store an application 1318. It should be appreciated that data processing system 1300 may further execute an operating system (not shown) that can facilitate execution of the application. Application, being implemented in the form of executable program code, can be executed by data processing system 1300, e.g., by processor 1302. Responsive to executing application, data processing system may be configured to perform one or more operations to be described herein in further detail.

In one aspect, for example, data processing system 1300 may represent a client data processing system. In that case, application 1318 may represent a client application that, when executed, configures data processing system 1300 to perform the various functions described herein with reference to a "client". Examples of a client data processing system can include, but are not limited to, a personal computer, a portable computer, a mobile phone, or the like.

Further, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module", "node" or "system." Furthermore, aspects of the present invention may take the form of a computer program product embodied in one or more computer readable medium(s) having computer readable program code embodied thereon.

Many of the functional units described in this specification have been labeled as modules, functions or clients in order to more particularly emphasize their implementation independence. For example, a module, function or client may be implemented as a hardware circuit comprising custom VLSI circuits or gate arrays, off-the-shelf semiconductors such as logic chips, transistors, or other discrete components. A module, function or client may also be implemented in programmable hardware devices such as field programmable gate arrays, programmable array logic, programmable logic devices or the like.

Modules, functions or clients may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. Method for enabling streaming of segmented content from a delivery node to a device comprising an adaptive streaming client on the basis of a manifest file, said manifest file comprising one or more segment identifiers, said method comprising:
    selecting at least one segment identifier from said manifest file, said segment identifier identifying a segment that has not been requested by said client when said selecting is performed; and,
    sending pre-announce information to a delivery node or a content delivery network beforehand for announcing that said segment is expected to be requested by said client, said pre-announce information comprising said at least one segment identifier, said pre-announce information being further arranged for triggering said delivery node or said content delivery network to ensure availability of said segment when said at least one segment is requested, wherein sending said pre-announce information comprises sending said pre-announce information in a pre-announce message to said delivery node or said content delivery network, and wherein at least part of said pre-announce information is inserted in the header of said message; and/or, in the body of said message, said message being a HTTP HEAD or a HTTP POST message.

2. Method according to claim 1 wherein said pre-announce information comprises a time period defining a period wherein said segment request is expected to be requested by said client.

3. Method according to claim 2 wherein ensuring availability of said segment further comprises:
    verifying whether the segment associated with said at least one segment identifier is ingested and/or stored on said delivery node or in said content delivery network; and,
    if said segment is not ingested and/or stored on said delivery node or in said content delivery network, storing said segment on said delivery node; or,
    if said segment is ingested and/or stored on said delivery node and/or in said content delivery network, maintaining the storage of said segment for a predetermined time period, said predetermined period being at least as long as the period wherein said segment request is expected to be requested by said client.

4. Method according to claim 1 wherein the header of said message comprises a pre-announce indicator that signals said delivery node or said content delivery network that the message is a pre-announce message.

5. Method according to claim 1 wherein said sending further comprises:
    sending said pre-announce information in an HTTP request message to a request routing node of a content delivery network;
    subsequently receiving a HTTP redirect message from said request routing node, said redirect message comprising the address or a segment locator associated with a delivery node in said content delivery node from which delivery of said segment is expected to be requested by said client;
    said client or said request routing node sending said pre-announce information in an HTTP request message to said delivery node on the basis of said address or segment locator;
    and,
    writing said address or segment locator in said manifest file.

6. Method according to claim 1 further comprising:
    sending, prior to sending said pre-announce information, a pre-announce support message to said delivery node or content delivery network, said pre-announce support message being configured for verifying whether said triggering by said delivery node or said content delivery network to ensure availability of said segment when said at least one segment is requested, is supported by said delivery node or said content delivery network; and,
    if said delivery node or said content delivery network supports the processing of pre-announce information of a client, receiving a pre-announce support confirmation message from said delivery node or said content delivery network that said triggering is supported.

7. Method according to claim 1, wherein selecting said at least one segment identifier further comprises:
using user navigation information from a user navigation function in said client and/or general navigation information in said manifest file for predicting said segment that is expected to be requested within a predetermined time period.

8. Method according to claim 1, wherein said delivery node or said content delivery network keeps track of the segments that it has stored and/or ingested within a predetermined period and wherein said delivery node or content delivery network is arranged not to be triggered by said pre-announce information to ensure availability of said segment when said segment is requested, if said delivery node or said content delivery network receives pre-announce information associated with a segment identifier that has been stored and/or ingested within said predetermined period.

9. Method according to claim 1 further comprising:
a filter function in said delivery node, said content delivery network, or a request routing node in said content delivery network, filtering messages that comprise pre-announce information and messages that do not comprise pre-announce information, by checking the presence of a pre-announce indicator in said message; and,
a message comprising pre-announce information triggering a cache control function in said delivery node or said content delivery network for checking the availability of a segment and, if said segment is not stored on said delivery node and/or ingested, ingesting and/or storing said segment on said delivery node or in said content delivery network; or, if said segment is stored on said delivery node or in said content delivery network, maintaining the storage of said segment for a predetermined time period, said predetermined period being at least as long as the period wherein said segment request is expected to be requested by said client.

10. Non-transitory storage medium comprising a computer program product, the computer program product comprising software code portions configured for, when run in the memory of a computer, executing the method steps according to claim 1.

11. Device comprising an adaptive streaming client configured for requesting of segmented content that is stored on a delivery node, said device comprising:
a cache for storing at least part of a manifest file, said manifest file comprising one or more segment identifiers for locating said delivery node;
a segment selector configured for selecting at least one segment identifier from said manifest file, said segment identifier identifying a segment that has not been requested by said client when said selecting is performed; and,
a pre-announce function configured for sending pre-announce information to a delivery node or a content delivery network beforehand for announcing that said segment is expected to be requested by said client, said pre-announce information comprising said at least one segment identifier, said pre-announce information being further arranged for triggering said delivery node or said content delivery network to ensure availability of said segment when said at least one segment is requested,
said client further configured for preparing a message comprising said pre-announce information and a pre-announce indicator, and wherein the sending of said pre-announce information comprises sending said pre-announce information in said message to said delivery node or said content delivery network, and wherein at least part of said pre-announce information is inserted in the header of said message; and/or, in the body of said message, said message being a HTTP HEAD or a HTTP POST message.

12. A network node comprising:
a processor configured to perform:
a cache control function for receiving HTTP HEAD or HTTP POST messages comprising pre-announce information for announcing that a segment is expected to be requested by a client, said pre-announce information comprising said at least one segment identifier, said pre-announce information being further arranged for triggering said network node in ensuring of availability of said segment when said at least one segment is requested, said ensuring of availability of said segment further comprising: verifying whether the segment associated with said at least one segment identifier is ingested and/or stored on said delivery node; and, if said segment is not ingested and/or stored on said delivery node, ingesting and/or storing said segment on said delivery node; or, if said segment is ingested and/or stored on said delivery node, maintaining the storage of said segment for a predetermined time period, said predetermined period being at least as long as the period wherein said segment request is expected to be requested by said client; and/or,
a filter function for distinguishing between said messages comprising pre-announce information and other messages not comprising pre-announce information, by checking the presence of a pre-announce indicator in said messages, wherein pre-announce information comprises said at least one segment identifier, said pre-announce information being arranged for triggering a delivery node or a content delivery network to ensure availability of said segment by said delivery node or content delivery network when said segment is requested by a client.

* * * * *